United States Patent
Clarke et al.

(10) Patent No.: US 11,015,324 B2
(45) Date of Patent: May 25, 2021

(54) WEAR ASSEMBLY REMOVAL AND INSTALLATION

(71) Applicant: ESCO Corporation, Portland, OR (US)

(72) Inventors: Rod Clarke, Cleveland (AU); Ryan J. Carpenter, Portland, OR (US); Noah Cowgill, Milwaukie, OR (US); Taylor M. Finley, Lake Oswego, OR (US); Joseph E. Blomberg, Portland, OR (US); Christopher M. Carpenter, Tualatin, OR (US); Eric L. Bewley, Salem, OR (US)

(73) Assignee: ESCO GROUP LLC, Portland, OR (US)

( * ) Notice: Subject to any disclaimer, the term of this patent is extended or adjusted under 35 U.S.C. 154(b) by 982 days.

(21) Appl. No.: 14/520,143

(22) Filed: Oct. 21, 2014

(65) Prior Publication Data
US 2015/0107075 A1 Apr. 23, 2015

Related U.S. Application Data

(60) Provisional application No. 61/893,833, filed on Oct. 21, 2013.

(51) Int. Cl.
*E02F 9/28* (2006.01)
*B25J 15/00* (2006.01)
(Continued)

(52) U.S. Cl.
CPC .......... *E02F 9/2891* (2013.01); *B23P 19/033* (2013.01); *B25J 11/00* (2013.01);
(Continued)

(58) Field of Classification Search
CPC ..... E02F 9/2891; E02F 9/2833; E02F 9/2816; B25J 11/00; B25J 15/0066; B25J 15/0608;
(Continued)

(56) References Cited

U.S. PATENT DOCUMENTS 3,927,778 A 12/1975 Zrostlik
4,932,145 A * 6/1990 Reeves, Jr. ........... E02F 9/2825
37/451

(Continued)

FOREIGN PATENT DOCUMENTS

DE 29902127 3/2000
EP 1522636 4/2005
(Continued)

OTHER PUBLICATIONS

Zhang et al., The Challenges of Integrating an Industrial Robot on a Mobile Platform, IEEE Int'l Conf. on Automation & Logistics, Hong Kong and Macau, Aug. 16-20, 2010.

*Primary Examiner* — Lawrence Averick
(74) *Attorney, Agent, or Firm* — Steven Schad; Palmer Dzurella

(57) ABSTRACT

A process and tool for installing and removing various kinds of wear parts used with earth working equipment. The process and tool allows the operator to remove and install the wear parts at a safe distance so that the operator is physically remote from the potential risks of the removal and installation process. The tool may be manually operated via an operator or the tool may be a semi-automated or fully automated.

35 Claims, 26 Drawing Sheets

(51) Int. Cl.
- *B25J 11/00* (2006.01)
- *B25J 15/06* (2006.01)
- *B23P 19/033* (2006.01)
- E02F 5/02 (2006.01)

(52) U.S. Cl.
CPC ....... *B25J 15/0066* (2013.01); *B25J 15/0608* (2013.01); *E02F 9/2816* (2013.01); *E02F 9/2833* (2013.01); *E02F 5/02* (2013.01); *Y10T 29/4973* (2015.01); *Y10T 29/53013* (2015.01); *Y10T 29/53478* (2015.01); *Y10T 29/53974* (2015.01)

(58) Field of Classification Search
CPC ...... B25J 5/00; B25J 15/0057; B25J 15/0061; Y10T 29/4973; Y10T 29/53478; Y10T 29/53974; Y10T 29/53013; B23K 9/028; B29K 20/21; C08L 21/00; C08L 23/00
USPC .......... 294/86.4, 2, 65.5, 190; 414/740, 741, 414/749.1, 815; 37/328, 446, 445, 456, 37/457, 458; 172/772; 299/85.2, 109; 29/402.08, 809, 281.4, 703
See application file for complete search history.

(56) References Cited

U.S. PATENT DOCUMENTS

| | | | |
|---|---|---|---|
| 5,022,812 A | 6/1991 | Coughlan et al. | |
| 5,104,024 A * | 4/1992 | Brewer | B21J 15/34 227/135 |
| 5,210,919 A | 5/1993 | Garman | |
| 5,259,721 A | 11/1993 | Sato et al. | |
| 5,409,415 A * | 4/1995 | Kawanami | B24C 11/00 451/39 |
| 5,410,478 A | 4/1995 | Richard et al. | |
| 5,531,337 A * | 7/1996 | Cappelletti | B61G 7/04 213/211 |
| 5,555,504 A * | 9/1996 | Lepper | G05B 19/4183 700/115 |
| 5,584,646 A | 12/1996 | Lewis et al. | |
| 5,672,044 A | 9/1997 | Lemelson | |
| 5,680,694 A * | 10/1997 | Best | B23P 21/004 29/701 |
| 6,477,730 B1 | 12/2002 | Marrero | |
| 6,671,582 B1 | 12/2003 | Hanley | |
| 6,990,390 B2 | 1/2006 | Groth et al. | |
| 7,600,460 B2 | 10/2009 | Manders | |
| 7,908,928 B2 * | 3/2011 | Vik | G01M 5/0033 73/806 |
| 8,024,874 B2 * | 9/2011 | McClanahan | E02F 9/2883 37/446 |
| 8,041,457 B2 * | 10/2011 | Ohno | B25J 9/1612 294/106 |
| 8,381,379 B2 * | 2/2013 | Holmes | F04D 29/542 29/254 |
| 8,381,501 B2 | 2/2013 | Koselka et al. | |
| 8,413,747 B2 | 4/2013 | Beard et al. | |
| 8,583,313 B2 * | 11/2013 | Mian | G05D 1/0229 700/245 |
| 8,890,672 B2 * | 11/2014 | Miller | H04Q 9/00 340/438 |
| 8,894,113 B2 * | 11/2014 | Harada | B25J 15/00 294/2 |
| 9,067,285 B2 * | 6/2015 | Ota | B23P 19/006 |
| 9,169,623 B2 * | 10/2015 | Rebinsky | E02F 9/267 |
| 9,194,666 B2 | 11/2015 | Dennis et al. | |
| 9,221,082 B2 * | 12/2015 | Alvarez | B08B 3/02 |
| 9,222,243 B2 * | 12/2015 | Cheyne | E02F 9/2841 |
| 9,227,323 B1 * | 1/2016 | Konolige | B25J 9/163 |
| 9,242,247 B2 * | 1/2016 | Lafond | B02C 4/08 |
| 9,267,900 B2 * | 2/2016 | Sakai | B08B 1/002 |
| 9,333,649 B1 * | 5/2016 | Bradski | B25J 9/163 |
| 9,393,686 B1 * | 7/2016 | Bradski | B25J 9/163 |
| 9,429,016 B2 * | 8/2016 | Derycke et al. | |
| 9,670,649 B2 * | 6/2017 | Bewley | E02F 9/2816 |
| 2002/0194754 A1 * | 12/2002 | Brown | E02F 3/404 37/446 |
| 2003/0221338 A1 * | 12/2003 | Verseef | E01H 5/062 37/266 |
| 2005/0261799 A1 * | 11/2005 | Groth | E02F 3/435 700/180 |
| 2007/0044349 A1 * | 3/2007 | McClanahan | E02F 9/2883 37/452 |
| 2008/0008546 A1 * | 1/2008 | Dietens | E02F 3/9212 408/18 |
| 2008/0047170 A1 * | 2/2008 | Nichols | E02F 3/435 37/348 |
| 2009/0035107 A1 | 2/2009 | Duran et al. | |
| 2009/0038186 A1 * | 2/2009 | Osswald | B62D 21/14 37/413 |
| 2009/0121061 A1 | 5/2009 | Salamanca | |
| 2009/0155032 A1 | 6/2009 | Hedley et al. | |
| 2009/0177324 A1 * | 7/2009 | Salamanca | B25J 9/1669 700/260 |
| 2010/0054903 A1 * | 3/2010 | Jones | B25J 15/0023 414/800 |
| 2010/0057254 A1 | 3/2010 | Salamanca | |
| 2010/0068024 A1 * | 3/2010 | Agens | B66C 3/18 414/729 |
| 2010/0076631 A1 * | 3/2010 | Mian | G05D 1/0229 701/19 |
| 2010/0095799 A1 * | 4/2010 | Albin | B25J 15/0213 74/490.01 |
| 2010/0164243 A1 * | 7/2010 | Albin | B66F 9/065 294/106 |
| 2010/0179691 A1 | 7/2010 | Gal et al. | |
| 2011/0030248 A1 * | 2/2011 | Clendenning | E02F 9/2825 37/456 |
| 2011/0131843 A1 * | 6/2011 | Carpenter | E02F 9/28 37/446 |
| 2011/0197416 A1 | 8/2011 | Hedley | |
| 2012/0067176 A1 * | 3/2012 | Ota | B23P 19/006 81/57.37 |
| 2012/0102703 A1 | 5/2012 | Salamanca | |
| 2012/0153652 A1 * | 6/2012 | Yamaguchi | B25J 15/0028 294/86.4 |
| 2012/0298706 A1 * | 11/2012 | Gordon | B25J 15/0491 224/401 |
| 2013/0000683 A1 * | 1/2013 | Alvarez | B08B 3/02 134/34 |
| 2013/0011234 A1 * | 1/2013 | Pretlove | B25J 5/005 414/749.1 |
| 2013/0035875 A1 | 2/2013 | Hall et al. | |
| 2013/0055880 A1 | 3/2013 | Dennis et al. | |
| 2013/0104361 A1 | 5/2013 | Corfitsen | |
| 2013/0129460 A1 * | 5/2013 | Gabibulayev | F15B 11/044 414/699 |
| 2013/0174453 A1 * | 7/2013 | Cheyne | E02F 9/2841 37/453 |
| 2013/0231777 A1 | 9/2013 | Salamanca | |
| 2013/0231779 A1 * | 9/2013 | Purkayastha | B25J 9/1697 700/259 |
| 2013/0268118 A1 * | 10/2013 | Grinstead | B25J 5/005 700/259 |
| 2014/0034765 A1 * | 2/2014 | Lafond | B02C 4/08 241/197 |
| 2014/0105481 A1 * | 4/2014 | Hasselbusch | G06T 7/0006 382/141 |
| 2014/0182174 A1 * | 7/2014 | Clendenning | E02F 9/2833 37/456 |
| 2014/0226154 A1 * | 8/2014 | Sakai | B08B 1/002 356/237.1 |
| 2015/0149049 A1 * | 5/2015 | Bewley | E02F 9/2816 701/50 |
| 2015/0368884 A1 * | 12/2015 | Cheyne | E02F 9/2841 37/453 |
| 2016/0281336 A1 * | 9/2016 | Clendenning | E02F 9/2825 |

(56) References Cited

U.S. PATENT DOCUMENTS

2016/0288324 A1\* 10/2016 Bradski .................... B25J 9/163
2017/0356167 A1\* 12/2017 Paul ..................... E02F 9/2891

FOREIGN PATENT DOCUMENTS

| JP | H08 120710 A | | 5/1996 | |
|---|---|---|---|---|
| RU | 2016756 | | 7/1994 | |
| RU | 7114 U1 | | 7/1998 | |
| SU | 1735512 | \* | 5/1992 | ................ E02F 9/28 |

\* cited by examiner

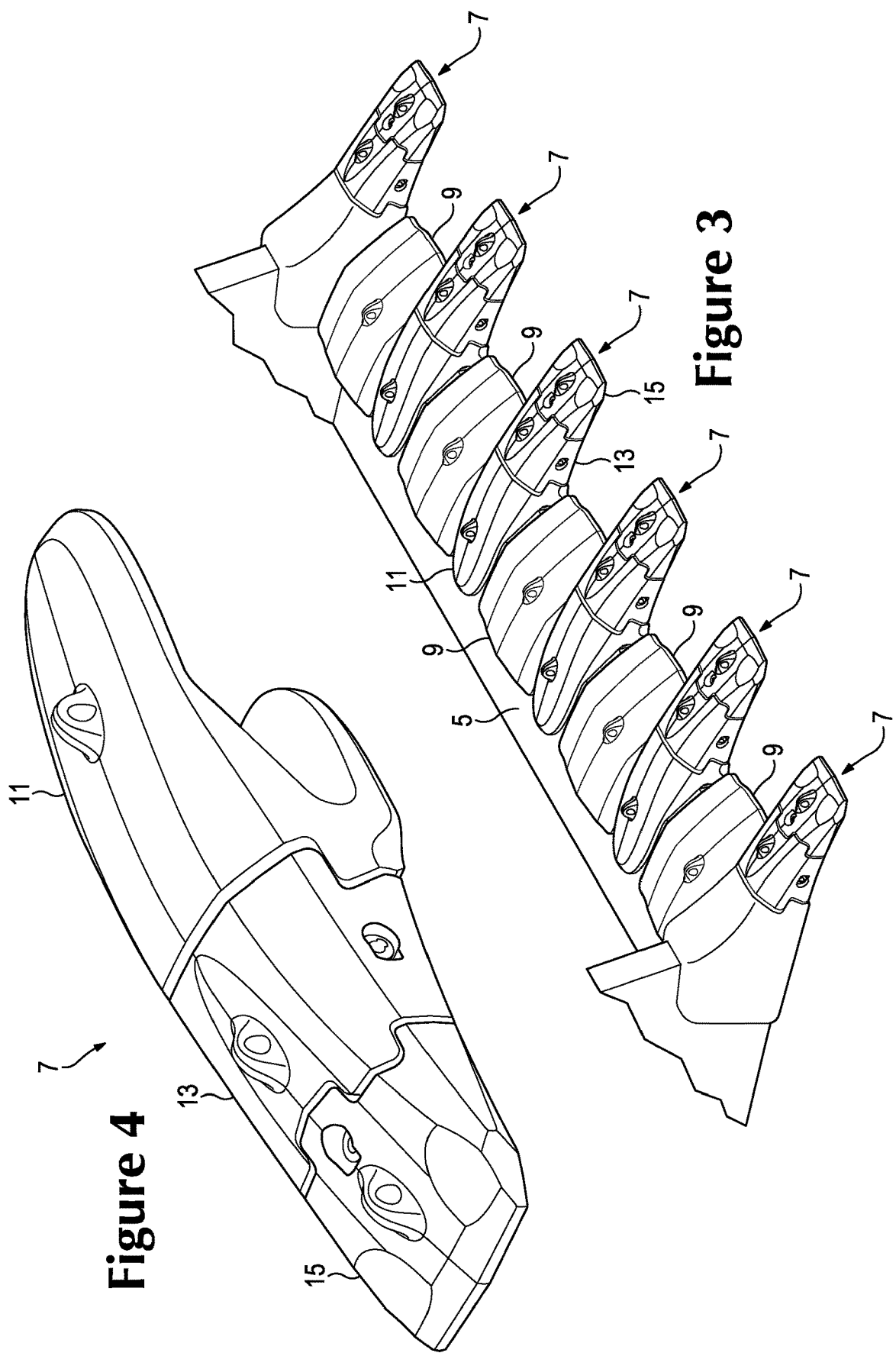

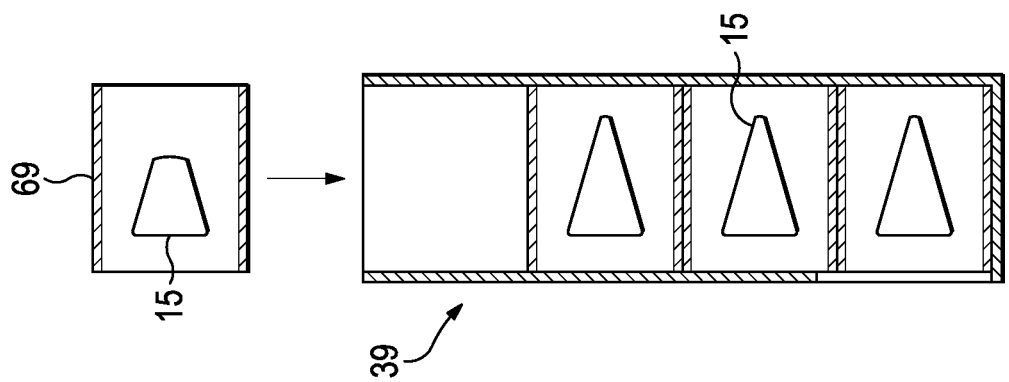
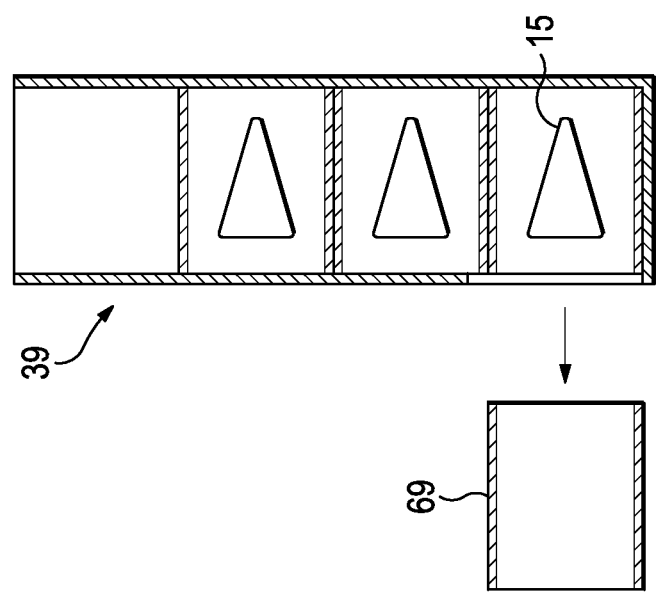
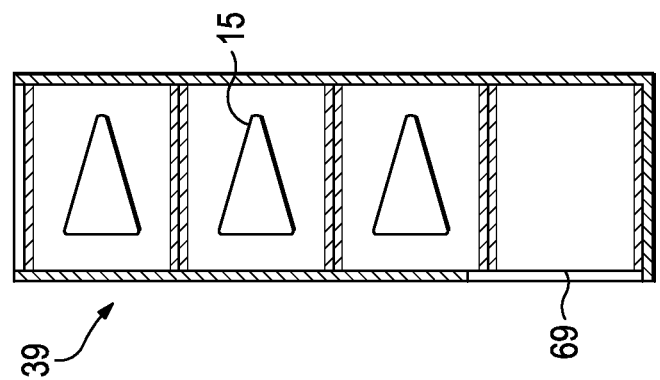
Figure 10c
Figure 10b
Figure 10a

WEAR ASSEMBLY REMOVAL AND INSTALLATION

RELATED APPLICATION

This application claims priority benefits to U.S. Provisional Patent Application No. 61/893,833 filed Oct. 21, 2013 and entitled "Automated Wear Assembly Removal and Installation," which is incorporated herein by reference in its entirety.

FIELD OF THE INVENTION

The present invention pertains to a removal and/or installation tool and process for wear assemblies used on various kinds of earth working equipment.

BACKGROUND OF THE INVENTION

In mining and construction, wear parts are commonly provided along the digging edge of excavating equipment such as buckets for dragline machines, cable shovels, face shovels, hydraulic excavators, bucket wheel excavators, and the like. The wear parts protect the underlying equipment from undue wear and, in some cases, also perform other functions such as breaking up the ground ahead of the digging edge. During use, the wear parts typically encounter heavy loading and highly abrasive conditions. As a result, they must be periodically replaced.

These wear parts usually comprise two or more components such as a base that is secured to the digging edge, and a wear member that mounts on the base to engage the ground. The wear member tends to wear out more quickly and is typically replaced a number of times before the base (which can also be a replaceable wear member) must also be repaired or replaced. One example of such a wear part is an excavating tooth that is attached to the lip of a bucket for an excavating machine. A tooth typically includes an adapter secured to the lip of a bucket and a point attached to the adapter to initiate contact with the ground. A pin or other kind of lock is used to secure the point to the adapter.

Often the wear parts are used on earth working equipment operated in remote locations. Getting new wear parts to the remote locations and installed on the earth working equipment can be difficult. For example, in a mining environment, the wear parts needing replacement may be on earth working equipment that cannot be easily moved to a maintenance facility when routine maintenance is required. Because of this, the wear parts are generally replaced while the earth working equipment is in the field. When the wear parts are replaced in the field, the environment in which the wear parts need to be replaced may be subjected to extreme environments. For example, the temperature may be extremely cold (e.g., freezing) or extremely hot, it may be snowing, sleeting, raining, or windy and the ground may be muddy, un-level, and/or unstable. In addition, the environment may be dusty which can pose health risks to operators. Thus the environment in which the wear parts must be replaced is varied and the environment is often difficult and/or unpredictable.

These wear parts are heavy and cannot be easily lifted by the installer, this increases the difficulty of replacing the wear parts. New wear parts are typically designed with cast lifting eyes integrally connected to the wear parts. A rigging system is attached to the lifting eyes to assist in lifting the wear parts during installation. However, the installer can still be in potential risk if the rigging arrangements are unsecure and slip or create pinch points. The installer maneuvers the wear part onto the excavating equipment. Once the wear part is fit on the excavating equipment the wear part is secured in place. Various methods known in the industry may be used to secure the wear parts in place. For example, the wear parts may be secured or locked to the excavating equipment with the use, e.g., of welds, bolts, wedges, or threaded members. The locking mechanisms require the installer to come in close proximity to the wear parts before the wear part is secured. Regardless of whether the wear part is attached to the rigging system at the time of installation, the potential for the wear part to separate from the excavating equipment and fall or swing prior to implementing the locking mechanism places the installer in potential risk.

As the wear parts contact the material to be excavated the integral lifting eyes are worn away leaving no way to gain an attachment point on the worn wear part. To remove the worn wear part some operators simply let the parts fall to the ground when the lock is removed, or use a hammer to knock the wear part from the base if fines prevent the release of the components. The uncontrolled falling of the wear part and the use of a hammer subject the operators to risks. Moreover, the operators are still left with needing to remove the wear parts from the ground to a discard pile or bin. Another common way to remove the worn wear parts is with a complex rigging arrangement using chains, straps, or other mechanisms to secure the wear part. However, during removal, the installer can still be in potential risk if the rigging arrangements are unsecure and slip or create pinch points. Additionally rigging arrangements that require chains, straps, or other mechanisms to go under the worn wear parts can be problematic when rigging is removed. Once the wear part is moved to the discard pile the rigging arrangements may be under the wear part requiring the operator roll or move the worn wear part to remove the rigging arrangement. The potential for the wear part to pinch or otherwise harm the operator as the heavy piece is rolled or moved off of the rigging arrangement places the operator in potential risk. Another alternative way to maneuver the worn wear part is to weld a lifting ring onto the part. This is not desirable because mobile welding equipment is needed at the machine site. In addition, wear parts tend to be composed of very hard steel which requires a careful and time consuming process to achieve a high quality weld. If there is a poor weld the lifting eye may be separated from the wear part causing uncontrolled movement of the wear part which becomes a potential risk to the installer.

SUMMARY OF THE INVENTION

The present invention pertains to a process for installing and removing various kinds of wear members used with earth working equipment including, for example, excavating equipment. With the present construction, the installer uses a tool to install and remove the wear parts quickly and safely. The tool is especially beneficial in a mining environment which can be varied and unpredictable resulting in an environment where the process for installing and removing wear parts can be difficult and hazardous to complete. The tool allows the installer to be remote from the wear parts, i.e., physically spaced a distance from the potential risks as the wear parts are removed from and/or installed onto the excavating equipment. The tool may be manually operated via an operator or the tool may be a semi-automated or fully automated tool.

In accordance with one aspect of the invention, a tool includes at least one auxiliary tool to hold a wear member, at least one manipulator to manipulate the auxiliary tool to engage and remove the wear member from earth working equipment, a controller, and a mobile base to move the tool to the earth working equipment. Such a tool can be used throughout a mine and/or moved to convenient locations to accommodate the removal of wear members from equipment that may be used in different locations or to service a number of different equipment operating at a mine.

In accordance with another aspect of the invention, a tool includes at least one auxiliary tool, at least one manipulator to movably support the auxiliary tool, an input device for receiving data regarding earth working equipment, and a controller that operates the auxiliary tool(s) and manipulator(s) based on the received data. Such a tool can easily accommodate a wide variety of earth working equipment, wear members or a varied of circumstances that may be faced at a mine or other variable work environment.

In accordance with another aspect of the invention, a tool includes a cartridge to receive and hold a wear member mounted on earth working equipment, a manipulator to movably support the cartridge, and a controller to operate the manipulator to place the wear member in the cartridge and remove it from the earth working equipment. The cartridge provides a secure and uniform manner of holding and removing the wear member with a high degree of safety.

In accordance with another aspect of the invention, a tool secures a gripping member to the wear member to facilitate holding and removing the wear member from earth working equipment, a manipulator movably supporting an auxiliary tool that secures the gripping member, and a controller. The use of a gripping member enables the tool to securely hold a wide variety of wear members with a uniform engaging structure.

In accordance with another aspect of the invention, a tool includes at least one auxiliary tool to release a hammerless retainer holding a wear member to earth working equipment, at least one manipulator movably supporting the auxiliary tool, and a controller. In this way, the removal of wear members, especially large wear members such as used in a mining operation, that utilize hammerless locks can be accomplished with the user remotely located to further reduce hazards associated with removal and installation of such wear members.

In accordance with another aspect of the invention, a tool includes a single manipulator that movably support at least one auxiliary tool to remove and install wear members on earth working equipment, and a controller. Such a tool is efficient in size and usage of the components of the tool to accomplish, e.g., a replacement of worn wear members with fresh replacement wear members.

In accordance with another aspect of the invention, a tool includes a manipulator movably supporting an auxiliary tool for holding and removing a wear member from earth working equipment, and a controller to operate the tool at least partially manually by a remote user to increase the safety of removing wear members, and especially large wear members such as used in a mine, from earth working equipment.

In accordance with another aspect of the invention, a mining tool for removing a wear member from earth working equipment used in a mine includes at least one auxiliary tool for releasing a retainer securing the wear member to the earth working equipment, at least one manipulator supporting the auxiliary tool, and a controller to operate the auxiliary tool(s) and manipulator(s).

In accordance with one aspect of the invention, a tool is brought to earth working equipment to remove and/or replace a wear member in such a manner that the operator is remote from the wear part through at least part of the process to increase safety for the users. The ability to move the tool allows the tool to be used with various kinds of earth working equipment that may not be easily moved to a maintenance facility and to service multiple numbers and/or kinds of equipment. The tool allows the wear parts to be replaced even when the earth working equipment is located in the field. In one preferred construction, the tool is operated by an operator. In another preferred construction, the tool is semi-automated and is able to complete portions of the installation and removal process without an operator. In another preferred construction, the tool is fully automated and does not require an operator to complete the removal and installation of worn wear parts.

In accordance with another aspect of the invention, a tool includes a manipulator and a controller to remove and/or install a wear member on earth working equipment. In one preferred construction, an operator uses a user input device to remotely control the manipulator. In another preferred construction, the controller uses programmable logic to complete portions or all of the removal and/or installation process without an operator. In one preferred construction, the manipulator is a servo-electric manipulator. In another preferred construction, the manipulator is a hydraulic manipulator. In another preferred construction, the manipulator is pneumatic.

In accordance with another aspect of the invention, a tool is secured in a fixed location and earth working equipment is brought to the tool when wear parts need replacement. This allows earth working equipment that can easily be moved from one location to another to be brought to a maintenance facility where the environment can more easily be controlled.

In accordance with another aspect of the invention, a tool references a database to identify what type of wear parts are currently installed on excavating equipment. In one preferred construction, the tool references the database remotely. In other constructions, the data for the database can be provided by, e.g., elements on the equipment (such as bar codes, QR codes, transmitters, etc.), wear identification devices on the equipment, mobile data collection devices, the tool or other devices, within the controller on the tool, manually inputted by a user, etc.

In accordance with another aspect of the invention, a tool receives information from an encoding element attached to excavating equipment. The encoded mechanism may include information on the bucket serial number, the capacity of the bucket, the excavating machine that the bucket is installed on, and the type of wear parts currently installed on the excavating equipment. In one preferred construction, the encoding element is a Radio-Frequency Identification (RFID). In another preferred construction, the encoding element is a barcode. In another preferred construction, the barcode is a Quick Response (QR) Code. In another preferred construction, the encoding element is located on an excavating bucket.

In accordance with another aspect of the invention, a tool receives information from a wear part monitoring unit to identify what type of wear parts are currently installed on excavating equipment. The wear part monitoring unit is a system to monitor the health of wear parts on the excavating equipment.

In accordance with another aspect of the invention, a tool receives information from a wear part monitoring unit to identify what wear parts need replacement on an excavating machine.

In accordance with another aspect of the invention, a tool receives information from sensors of a wear part monitoring unit to assist the tool in locating the wear parts needing replacement and assist the tool when installing the new wear parts on the earth working equipment.

In accordance with another aspect of the invention, a tool communicates with a database to record information about a process completed by the tool. In one preferred construction the tool communicates at least one of: i) the time and date that the wear parts were removed and replaced, ii) how long the change-out of the wear parts took, iii) machine the wear parts were installed on, iv) type of wear parts replaced and installed, v) torque needed to remove a securement mechanism holding the wear part to the earth moving equipment, vi) torque used to install securement mechanism to hold the wear part to the earth moving equipment, and vii) the geographic location of where the wear parts were replaced.

In accordance with another aspect of the invention, a tool determines the orientation and location of a wear part on excavating equipment needing replacement using sensors. The sensors allow the tool to know the location and orientation of the wear parts even when the earth working equipment may be located on un-level ground and the wear parts have various orientations relative to the ground. In one preferred construction, the sensors are passive. In another preferred construction, the sensors are active. In another preferred construction, the sensors are chosen from a group including receivers, transmitters, and/or digital sensors. In another preferred construction, Global Positioning System (GPS) receivers are used to locate the wear part. In another preferred construction, electromagnetic wave receivers and transmitters are used to locate the wear part needing replacement. In a preferred construction the electromagnetic waves have a wavelength greater than the visible spectrum (e.g., infrared, microwave, or Radio Frequency [RF]). In another preferred construction, mechanical wave receivers and transmitters are used to locate the wear part needing replacement. In a preferred construction the mechanical waves are in the ultrasonic spectrum. In another preferred construction, laser receivers and transmitters are used to locate the wear part needing replacement. In one preferred construction, a digital inclinometer unit and a digital compass are used to determine the orientation and location of the wear part needing replacement. In one preferred construction, a camera and vision recognition software are used to identify the excavating equipment and determine the orientation and location of the wear part needing replacement.

In accordance with another aspect of the invention, a tool uses an automated or semi-automated process for removing and installing a wear part from excavating equipment operates autonomously and is also capable of being operated by an operator with a user input device. Allowing the automated tool to be operated by the operator allows other functions of the automated process to operate more efficiently. In addition the user input device allows the automated process to continue should the automated tool encounter an error. In one preferred construction, the user input device has haptic, visual, or audible feedback. In one preferred construction, the user input device is a joystick. In another preferred construction, the user input device is an operator physically (e.g., with their hands) guiding the manipulator to the desired positions. In another preferred construction, the user input device is a wearable user interface.

In accordance with another aspect of the invention, a tool is automated to determine if a wear part is appropriately oriented for removal by obtaining the wear part orientation and location from a digital sensor. In one preferred construction, a digital inclinometer unit is used to determine the tilt of the wear parts needing replacement. In one preferred construction, a camera and vision recognition software are used to identify the excavating equipment and determine if the wear part needing replacement is appropriately oriented for removal.

In accordance with another aspect of the invention, a tool includes a plurality of arms that are used to secure at least two opposing sides of the wear member. In one preferred construction, the multi-arm tool has at least two arms. In another preferred construction, the multi-arm tool has at least three arms. Two arms contact the sides of the wear member and one arm contacts the bottom of the wear member to secure the wear member to the tool.

In accordance with another aspect of the invention, a tool includes two or more auxiliary tools (or sub-tools) that are combined into a single multi-purpose tool. In one preferred construction, a first auxiliary tool secures the wear member and a second auxiliary tool removes the securement mechanism or retainer holding the wear member to the base.

In accordance with another aspect of the invention, a tool includes a manipulator provided with an auxiliary tool (or sub-tool) that has an adjustment mechanism so that the tool can be adjusted without adjusting the orientation of the manipulator.

In accordance with another aspect of the invention, a magnetic strap is used to ensure that a wear part to be replaced does not prematurely become disengaged from excavating equipment. In one preferred construction, the magnetic strap utilizes at least one air actuated permanent magnet.

In accordance with another aspect of the invention, a tool includes two auxiliary tools to remove and install a wear part, a first auxiliary tool to secure the wear part from falling and a second auxiliary tool to engage and disengage the wear part from a base. In a preferred construction, the first and second auxiliary tools are both supported by manipulators.

In accordance with another aspect of the invention, a manipulator with two arms is used to remove and install a wear part, a first arm to secure the wear part from falling and a second arm to engage and disengage the wear part from a base.

In accordance with another aspect of the invention, a tool is automated and uses multiple auxiliary tools to perform an automated process for removing and installing wear parts secured to excavating equipment.

In accordance with another aspect of the invention, a tool uses an adjustable multi-jaw gripper to secure a wear part from falling off of a base attached to excavating equipment.

In accordance with another aspect of the invention, a cartridge fits around a wear part and secures the wear part for removal. In one preferred construction, the cartridge is secured to an automated tool. In another preferred construction, the cartridge is secured to a tool that requires an operator to maneuver the cartridge. In another preferred construction, the wear parts needing replacement are brought to the cartridge.

In accordance with another aspect of the invention, locators or guides are secured to interior walls of a cartridge to assist in properly positioning a wear part within the cartridge.

In accordance with another aspect of the invention, a cartridge is used for shipping, storing, installing, and removing a wear part.

In accordance with another aspect of the invention, a cartridge has at least one attachment mechanism for lifting the cartridge, for rotating the cartridge, for pulling the cartridge, or for pushing the cartridge. An attachment mechanism that can be lifted, pulled, or pushed allows a wear part secured within the cartridge to be installed and removed from a base secured to excavating equipment.

In accordance with another aspect of the invention, a tool uses pressurized fluid to remove fines from a wear part. In one preferred construction, pressurized air with or without suspended abrasive grains is used to remove fines. In another preferred construction, pressurized liquid is used to remove fines.

In accordance with another aspect of the invention, a tool uses a vibrator to remove fines from a wear part. In one preferred construction, the vibrator is secured to the wear part with at least one electromagnet, electrically re-polarized permanent magnet, or air actuated permanent magnet. In one preferred construction, the vibrator is isolated from the tool so that the vibrations do not negatively affect the tool.

In accordance with another aspect of the invention, a tool secures a gripping piece to a securement mechanism, such as a hammerless retainer, and uses the newly attached piece to remove the securement mechanism from the wear part. In one preferred construction, the tool uses a stud, a stud welder and a pneumatic wrench or hydraulic wrench to remove the securement mechanism.

In accordance with another aspect of the invention, a tool uses force control and a tool that matches an opening in a securement mechanism to locate, create a positive engagement with the securement mechanism, remove, and install the securement mechanism.

In accordance with another aspect of the invention, a tool uses a cutter to remove the securement mechanism. In one preferred construction, the cutter is an arc cutter. In another preferred construction, the cutter is a waterjet cutter. In another preferred construction the cutter is spun in a circle to remove the securement mechanism. In another preferred construction, only a portion of the securement mechanism is cut. In another preferred construction, the entire securement mechanism is completely cut away. In another preferred construction, the cutter is an electric air arc torch. In another preferred construction, the cutter is a laser.

In accordance with another aspect of the invention, a tool uses a magnet to remove the securement mechanism from a wear part and dispose of the securement mechanism in a disposal stall. In one preferred construction, the magnet is an air actuated permanent magnet, electromagnet, or electrically re-polarized permanent magnet.

In accordance with another aspect of the invention, a tool uses a vacuum to create a positive engagement with the securement mechanism to remove the securement mechanism from a wear part and dispose of the wear part in a disposal stall.

In accordance with another aspect of the invention, a tool secures at least one new piece to the worn wear part and uses the newly attached piece to remove the wear part from the base. In one preferred construction, the tool uses a stud welder to attach the new piece to the worn wear part.

In accordance with another aspect of the invention, a tool uses a vibrator to initially disengage a wear part from a base secured to excavating equipment.

In accordance with another aspect of the invention, a tool uses a magnet to remove a wear part from a base and dispose of the wear part in a disposal stall. In one preferred construction, the magnet is an air actuated permanent magnet.

In accordance with another aspect of the invention, a tool uses a multi-jaw gripper to remove a wear part from a base and dispose of the wear part in a disposal stall.

In accordance with another aspect of the invention, a disposal stall has fixtures for supporting wear parts so that each wear part is maintained in a fixed location.

In accordance with another aspect of the invention, each replacement wear member is maintained in a fixed location and orientation on a pallet so that the tool can locate the new wear part and properly orient the part for installation.

In accordance with another aspect of the invention, a tool rigidly grips a wear part so that the wear part maintains a fixed orientation as the tool moves the wear part.

In accordance with another aspect of the invention, a tool is automated and verifies a new wear part is fully seated on a base by comparing the current location of the securement mechanism on the new wear part with the previously established location of the securement mechanism on the worn wear member.

In accordance with another aspect of the invention, a tool performs visual checks to ensure that a wear part is fully seated on the base. In one preferred construction, the visual check is performed using a 2D vision camera.

In accordance with another aspect of the invention, a tool is automated and has been programmed with the geometry of a wear part being installed and has been programmed with where to place a securement mechanism on the wear part.

In accordance with another aspect of the invention, a tool is automated and has error handling should the excavating equipment unexpectedly move.

In accordance with another aspect of the invention, a process for removing a wear member from earth working equipment in a mine includes operating a powered manipulator to move an auxiliary tool into proximity with the wear member, operating the auxiliary tool to engage and hold the wear member, and removing the wear member from the earth working equipment through operation of the manipulator and/or the auxiliary tool.

In accordance with another aspect of the invention, a process for moving a retainer that secures a wear member to earth working equipment in a mine to a release position, and moving an auxiliary tool into proximity with the retainer to engage and release the retainer to permit removal of the wear member.

In accordance with another aspect of the invention, a process for removing a wear member from earth working equipment includes operating a manipulator to move an auxiliary tool into proximity with the wear member, operating the auxiliary tool to hold the wear member while the operator remains remote from the wear member.

To gain an improved understanding of the advantages and features of the invention, reference may be made to the following descriptive matter and accompanying figures that describe and illustrate various configurations and concepts related to the invention.

BRIEF DESCRIPTION OF THE DRAWINGS

FIG. 3 is a perspective view of a lip of an excavator hoe bucket.

FIG. 4 is a perspective view of a tooth assembly.

FIG. 10a is a cross-sectional view of a storage pallet in a magazine formation in accordance with the present invention.

FIG. 10b is another cross-sectional view of the storage pallet showed in FIG. 10a with a cartridge removed from the magazine.

FIG. 10c is another cross-sectional view of the storage pallet showed in FIG. 10a with a cartridge about to be placed in the magazine.

FIG. 18c is a front view of the cartridge shown in FIG. 18a.

FIG. 19b is a top view of the multi-jaw gripper of FIG. 19a.

FIG. 19c is a side view of the multi-jaw gripper of FIG. 19a.

FIG. 19d is a front view of the multi-jaw gripper of FIG. 19a.

FIG. 20b is a perspective view of a ring nozzle to be used with the pressure washing system of FIG. 20a.

FIG. 20c is a perspective view of a frame and sliding carriage to be used with the pressure washing system of FIG. 20a.

FIG. 25b is a top view of the wear member and base in FIG. 25a.

FIG. 26b is a cross-sectional view of the custom tool in FIG. 26a taken alone lines 26b-26b in FIG. 26a.

DETAILED DESCRIPTION OF THE PREFERRED EMBODIMENTS

The present invention pertains to a tool and a process for removing and installing various kinds of wear parts for earth working equipment including, for example, excavating equipment and ground conveying equipment. Excavating equipment is intended as a general term to refer to any of a variety of excavating machines used in mining, construction and other activities, and which, for example, include dragline machines, cable shovels, face shovels, hydraulic excavators, and dredge cutters. Excavating equipment also refers to the ground-engaging components of these machines such as the bucket, blade, or the cutter head. Ground conveying equipment is also intended as a general term to refer to a variety of equipment that is used to convey earthen material and which, for example, includes chutes and mining truck beds. The present invention is suited for removing and installing wear parts of excavating equipment in the form of, for example, excavating teeth and shrouds. Additionally, certain aspects of the present invention are also suited for removing and installing a wear surface in the form of, for example, runners. For convenience of discussion, the wear part removal and installation process is discussed in terms of replacing a point on a mining excavator. However, the removal and installation process may be used with other wear parts used with earth working equipment.

Relative terms such as front, rear, top, bottom and the like are used for convenience of discussion. The terms front or forward are generally used to indicate the usual direction of travel during use (e.g., while digging), and upper or top are generally used as a reference to the surface over which the material passes when, for example, it is gathered into the bucket. Nevertheless, it is recognized that in the operation of various earth working machines the wear assemblies may be oriented in various ways and move in all kinds of directions during use.

Figure 1:
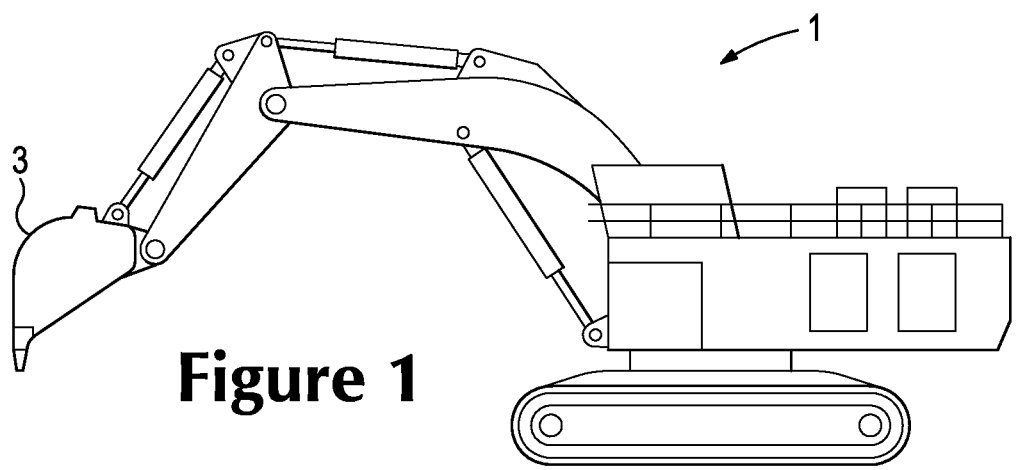
FIG. 1 is a side view of a mining excavator.
Figure 2:
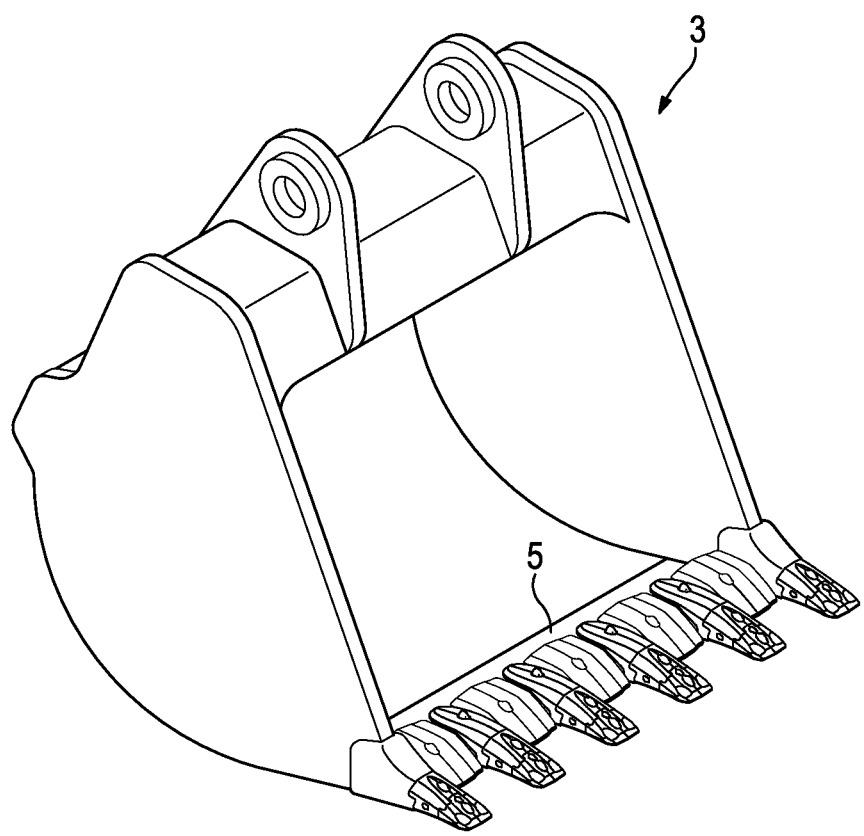
FIG. 2 is a perspective view of an excavator hoe bucket.
Figure 5:
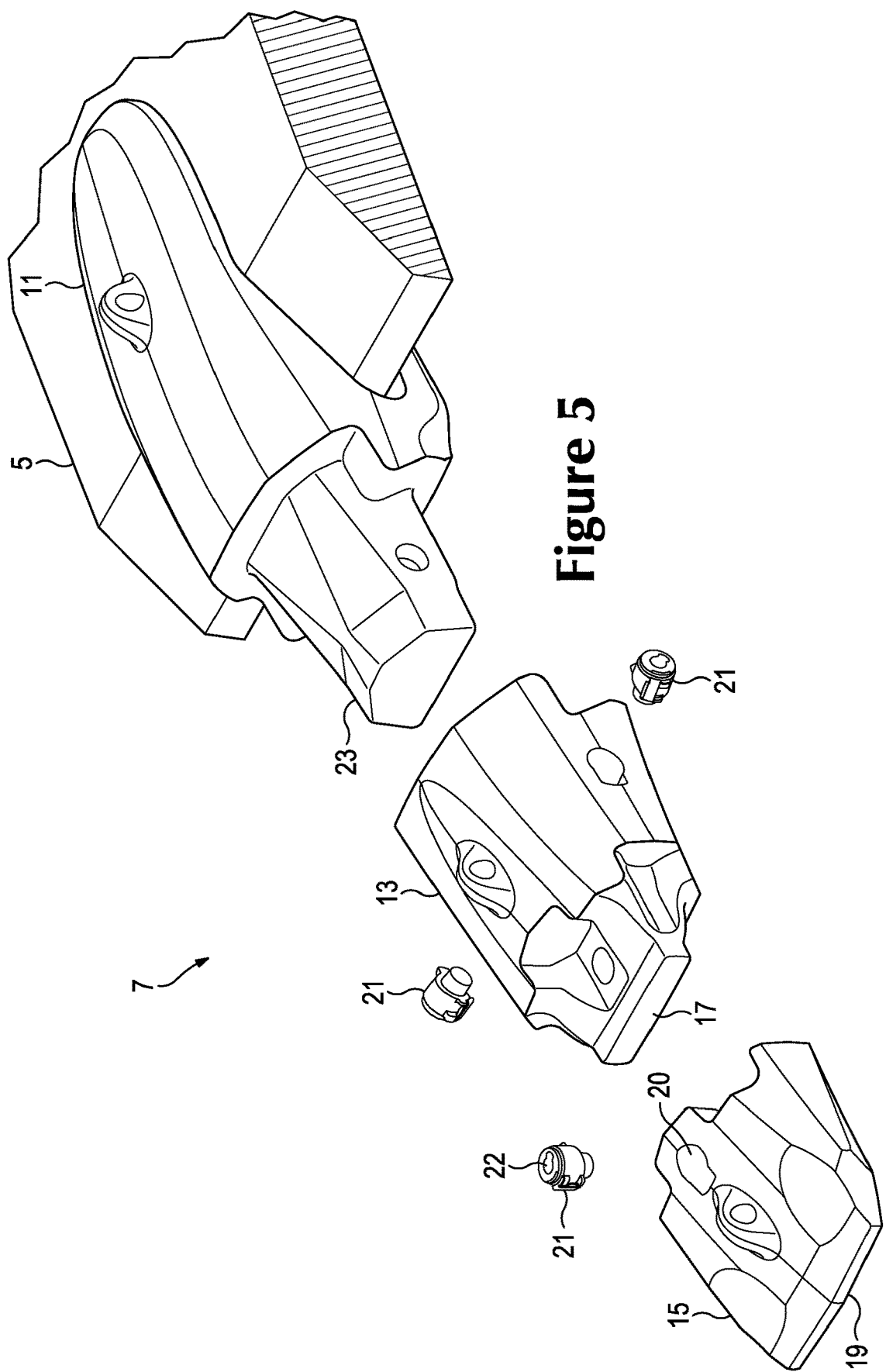
FIG. 5 is an exploded perspective view of the tooth assembly shown in FIG. 4.

A mining excavator 1 is equipped with a bucket 3 for gathering earthen material during digging (FIG. 1). The bucket 3 has a lip 5 that is the digging edge of the bucket 3 (FIGS. 2 and 3). The digging edge is that portion of the equipment that leads the contact with the ground. Tooth assemblies and shrouds are often secured to the digging edge to protect the edge and break up the ground ahead of the lip. Multiple tooth assemblies 7 and shrouds 9, such as disclosed in U.S. patent application Ser. No. 13/547,353 which is incorporated herein by reference, may be attached to lip 5 of bucket 3 (FIGS. 4 and 5). The illustrated tooth 7 includes an adapter 11 welded (or otherwise secured) to lip 5, an intermediate adapter 13 mounted on adapter 11, and a point (also called a tip) 15 mounted on base 13. While one tooth construction 7 is shown, other tooth arrangements are possible. Point 15 includes a rearwardly-opening cavity to receive nose 17, and a front end 19 to penetrate the ground. A securement mechanism, typically called a retainer, pin or lock 21, is used to secure wear member 15 to base 13, and base 13 to nose 23 (FIGS. 2 and 3), though different locks could be used to secure point 15 and base 13. In this application, point 15 is typically referred to as the wear member and intermediate adapter 13 as the base. Nevertheless, intermediate adapter 13 and adapter 11 are wear members as well. For example, when intermediate adapter 13 needs replacement, it can be referred to as the wear member and adapter 11 as the base. Similarly, when adapter 11 needs replacement, it can be referred to as the wear member and lip 5 as the base. During the life of the bucket, the wear members 11, 13, 15 are usually replaced a number of times.

Figure 6:
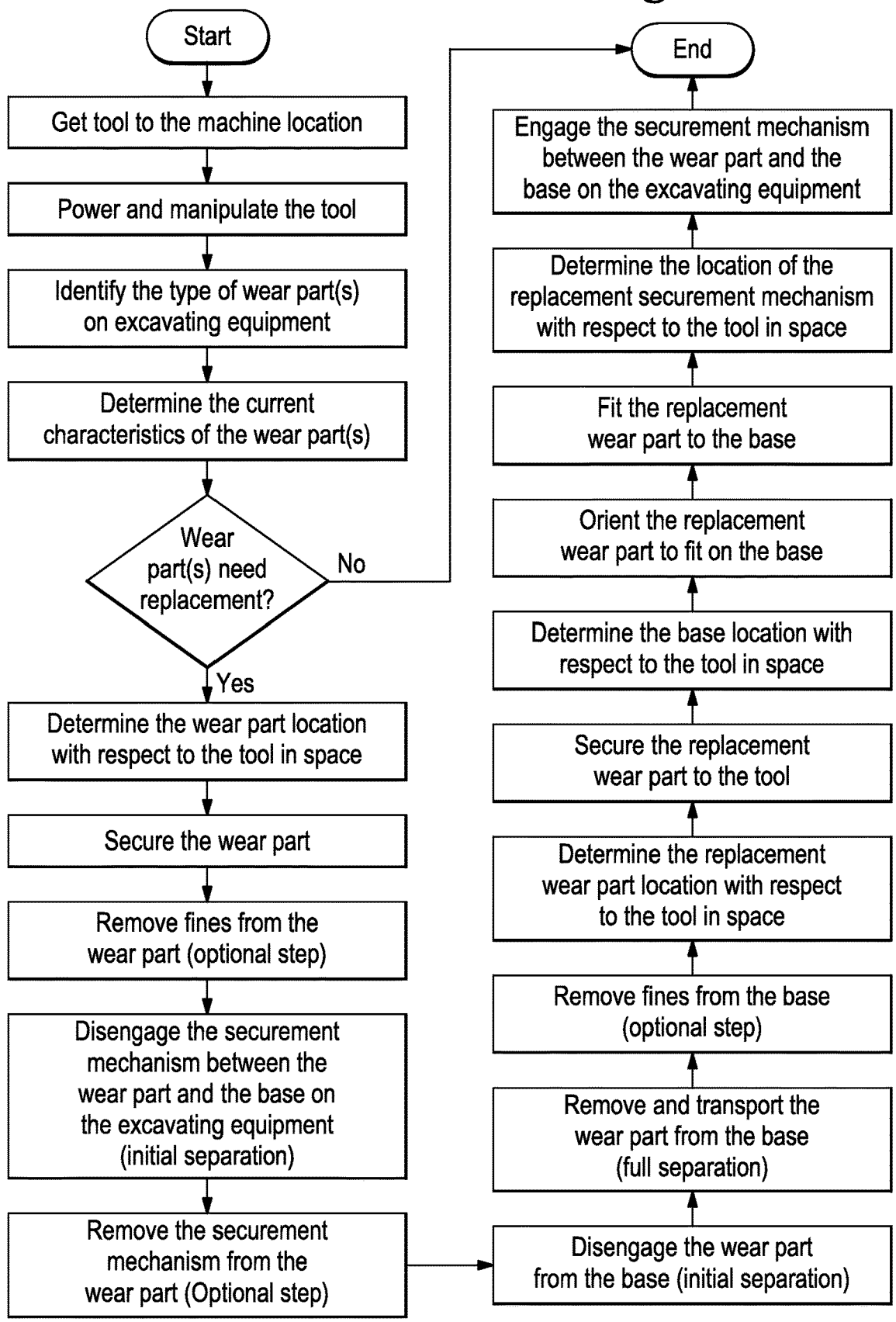
FIG. 6 outlines the general process steps for automating wear part removal and installation in accordance with the present invention.

FIG. 6 illustrates the steps to a process for removing and installing worn wear members 15 on an excavating bucket 3. The process may be accomplished by an installer/operator or the process may be a semi-automated process (i.e., various steps within the process may be automated) or a fully automated process. Variations in the process exist. For example, it may be desirable to replace more than one wear member at a time and it may be desirable to first remove all of the wear members before installing the new wear members.

Figure 7:
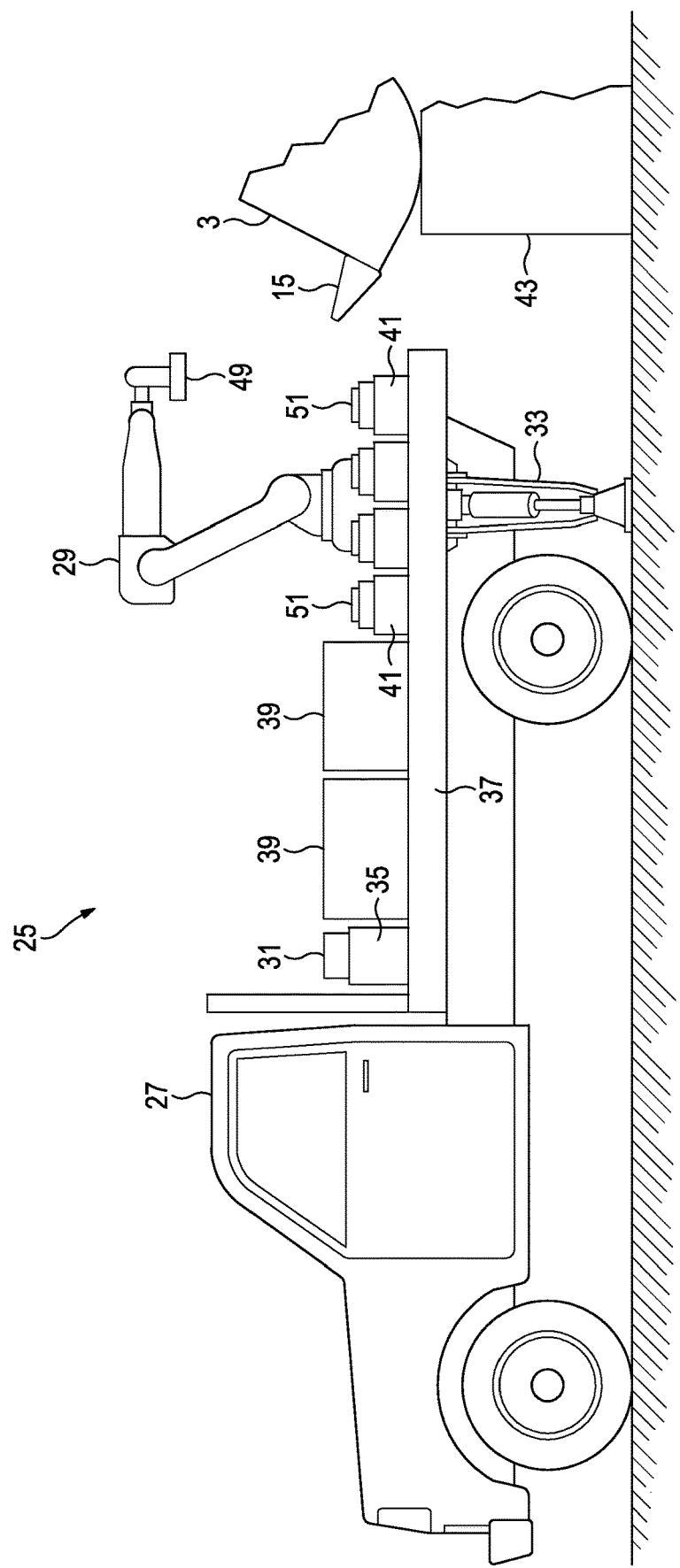
FIG. 7 is a side view of a tool in accordance with the present invention.

In accordance with one embodiment of the invention, a tool 25 is used to remove and install wear members 15 (FIG. 7). The tool 25 is brought to the excavating equipment 1 needing maintenance so that the wear parts may be replaced even when the earth working equipment is in a remote location and the wear parts must be replaced in the field. The tool 25, for example, may be a service vehicle 27 as a mobile base with at least one manipulator 29 and at least one controller 31 such as a Central Processing Unit (CPU) with programmable logic. The controller can be a single CPU or a combination of CPUs located, for example, in the auxiliary tools, manipulators and/or service vehicle. The controllers can be in a remote location or, as described below, can be manually operated or partially manually operated. The service vehicle 27 may also be equipped with outrigger stabilizers 33, a power source 35, a manipulator platform 37, storage stalls or pallets 39, and auxiliary tools or sub-tools 41 to be used in conjunction with the manipulator 29. The service vehicle is wheeled so that it can easily be moved from one location to another. In an alternative embodiment not shown, the service vehicle may have tracks or may have wheels and tracks. The service vehicle 27 is driven to the mining excavator 1 by an operator located within the service vehicle 27. Alternatively, the service vehicle 27 may be driven to the mining excavator 1 normally or remotely via a user input device. For example, the service vehicle 27 may be remotely driven with a joystick (not shown) and cameras (not shown) located on the service vehicle 27. In another alternative, the service vehicle 27 may be fully automated and programmed to drive to the mining excavator 1 needing wear members 15 replaced.

The service vehicle 27 is driven close enough to the excavator bucket 3 so that the manipulator 29 is able to reach the wear members 15 on the bucket 3. Once in position the hydraulic outrigger stabilizers 33 are lowered to provide a stable platform for the manipulator 29. The manipulator platform 37 may be located on the service vehicle 27 low enough so that the manipulator 29 is able to reach the wear members 15 when the bucket 3 is set on the ground. In some cases, the excavator operator may need to adjust the bucket 3 so that the bucket 3 is tilted up or prop the bucket 3 on a platform 43 so that the manipulator 29 is able to reach the wear members 15 when the manipulator 29 is located on the service vehicle 27 (FIG. 7). Service vehicle 27 may be equipped with a lift (not shown), turntable and/or translating assemblies to lower, turn and/or move the manipulator 29 so that the manipulator 29 is able to reach the wear members 15 on the bucket 3.

The manipulator 29 and auxiliary tools 41 may be powered from a number of power sources. For example, the manipulator 29 and auxiliary tools 41 may be powered via the service vehicle, a generator, or batteries.

The manipulator platform 37 may be equipped with rails (not shown) for the manipulator 29 to slide towards the front of the service vehicle 27, towards the rear of the service vehicle 27, and/or towards either side of the service vehicle 27. Commercially available chains, hydraulic actuators, or electric actuators (driving a rack and pinion or ball screw) (not shown) may be connected to the manipulator 29 to move the manipulator 29 along the rails.

Figure 9:
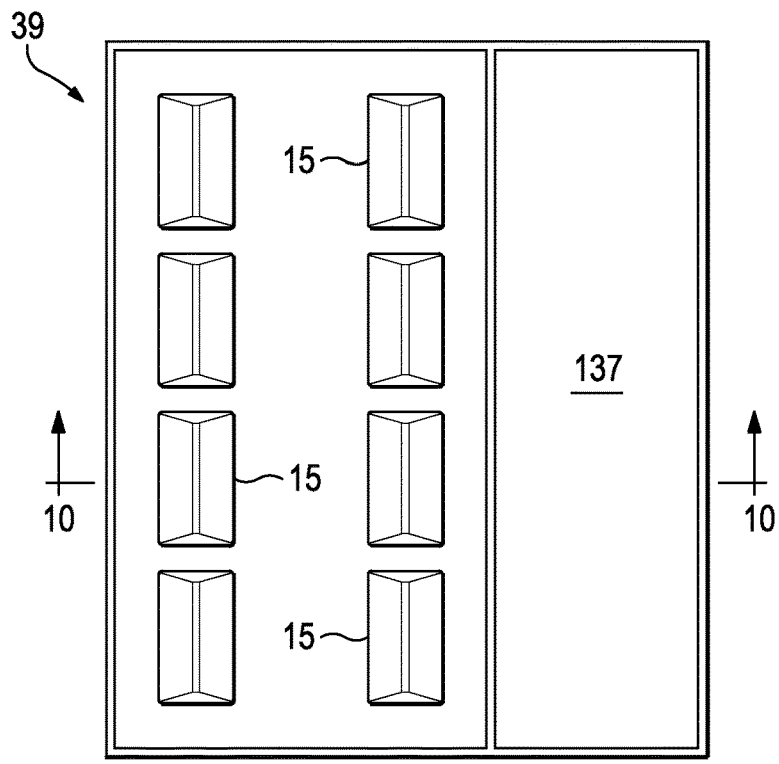
FIG. 9 is a top view of a storage pallet in accordance with the present invention.
Figure 10:
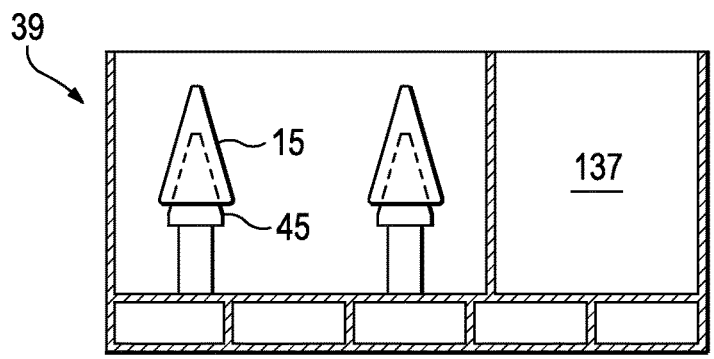
FIG. 10 is a cross-sectional view of the storage pallet in FIG. 9 taken along line 10-10.

The storage stalls or pallets 39 on the service vehicle 27 may be a part of the manipulator platform 37, integrated with the service vehicle 27, or may be detachable from the service vehicle 27 so that all of the wear members 15 are loaded onto the service vehicle 27 in the storage stalls 39 prior to the service vehicle 27 being deployed to the field (FIGS. 7, 9, and 10). The storage stalls 39 may be equipped with fixtures or jigs 45 to support the wear members 15 so that each wear member 15 has a fixed orientation and location relative to the manipulator 29 once installed on the service vehicle 27.

The manipulator 29 may be custom built or may be a commercial off-the-shelf servo-electric manipulator or a commercial off-the-shelf hydraulic manipulator, or a commercial off-the-shelf pneumatic manipulator. The manipulator 29 may have integrated force sensing or may be equipped with an aftermarket off-the-shelf force sensing device. Examples of manipulators 29 that may be used include, but are not limited to, a Fanuc m-900ia-400L servo-electric robot with integrated force sensing, an ABB IRB 7600-500 servo-electric robot equipped with an ATI aftermarket Force/Torque Sensor, a Motoman HP500D servo-electric robot equipped with an ATI aftermarket Force/Torque Sensor, or a Vulcan Action 500 hydraulic manipulator.

Figure 8:
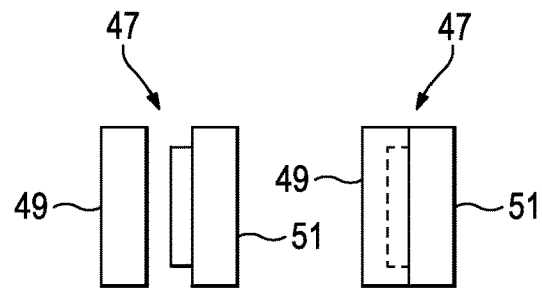
FIG. 8 is a side view of a tool changer in accordance with the present invention.

The service vehicle 27 may be equipped with one or more of a variety of auxiliary tools 41 usable to remove and/or install wear members 15. The auxiliary tools 41 are preferably located in a fixed location relative to the manipulator 29. The manipulator 29 may be equipped with an industry standard tool changer 47 to allow the manipulator 29 to quickly change from one auxiliary tool to another auxiliary tool to perform various functions of the removal and installation process. The tool changer 47 has a first side 49 that connects to the manipulator 29 and a second side 51 that connects to the auxiliary tool 41 (FIG. 8). The two sides 49 and 51 of the tool changer 47 are coupled together when in use and decoupled when not in use. For example, the manipulator 29 may be equipped with an ATI Robotic Tool Changer. The various types of auxiliary tools 41 the service vehicle 27 may be equipped with are discussed in detail below. The manipulator may also concurrently support multiple auxiliary tools 41.

Figure 11:
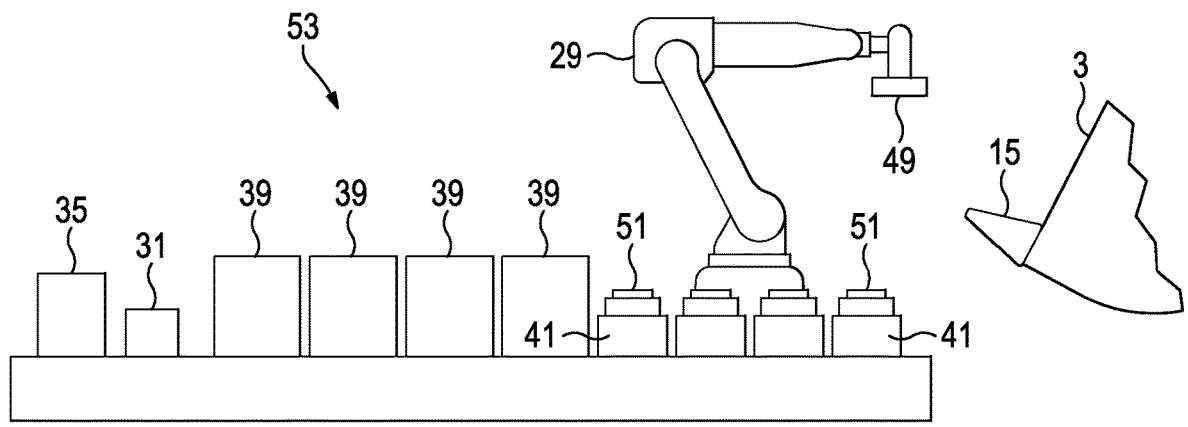
FIG. 11 is a side view of second embodiment a tool in accordance with the present invention.

In an alternative embodiment (FIG. 11), a service station 53 is equipped with a power source 35, at least one controller 31 in the form of a CPU with programmable logic, at least one manipulator 29, storage stalls 39, and auxiliary tools 41 to be used in conjunction with the manipulator 29. The service station 53 is similar in many ways to service vehicle 27 with many of the same benefits and purposes. The following discussion focuses on the differences and does not repeat all the similarities that apply to service station 53. A mining excavator 1 is brought to the service station 53 and located close enough to the manipulator 29 so that the manipulator 29 is able to reach the wear members 15 on the bucket 3. As with the service vehicle 27, the service station 53 may be equipped with rails (not shown) for the manipulator 29 to slide back and forth on. The manipulator 29 and auxiliary tools 41 in the service station 53 may be powered from a number of power sources 35. For example, the manipulator 29 and auxiliary tools 41 may be powered via a generator, batteries, or powered by an existing power system. Service station 53 is preferably located in a convenient location for the earth working tools to approach and for operators to access. Nevertheless, the service station can be located in the field and can include a mobile base such as a trailer to be moved to different locations.

Once the service vehicle 27 is in position relative to the excavating bucket 3 or the excavating bucket 3 is in position relative to the service station 53 the type of wear members 15 on the bucket 3 are identified. The wear members 15 on the bucket 3 may be identified by an operator manually entering the information into the controller 31. The operator may input a specific identifier related to the excavating equipment 1, and controller 31 uses the identifier to references a database of wear members 15 on the identified excavating equipment 1.

Figure 12:
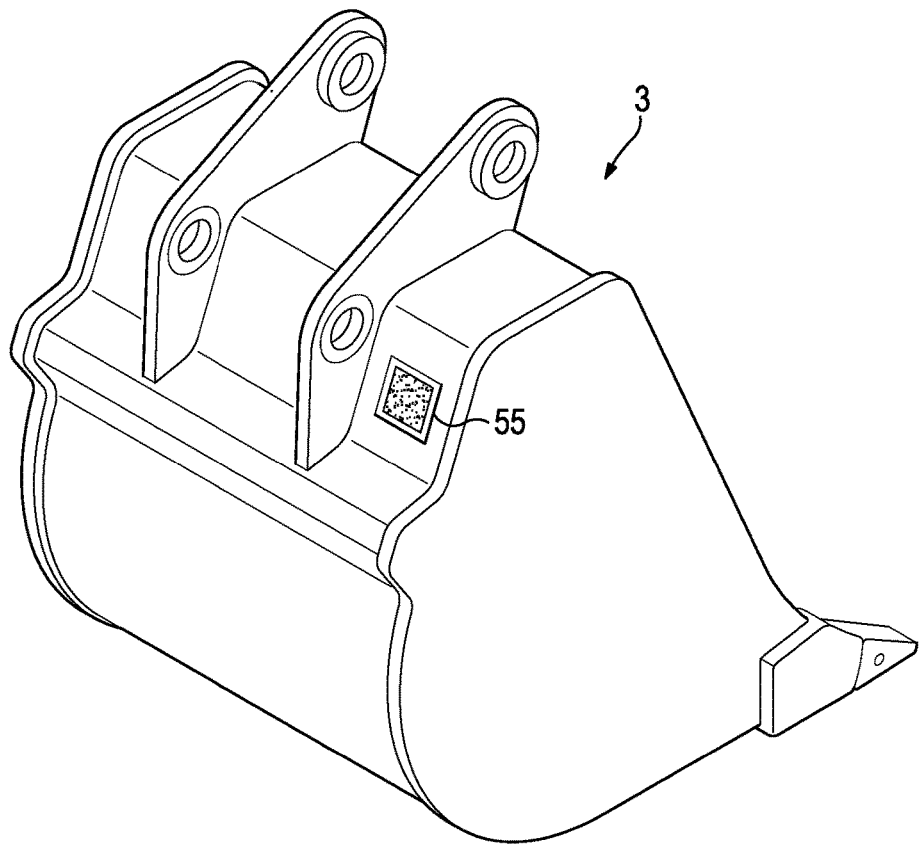
FIG. 12 is a rear perspective view of a bucket with an encoding element of the present invention.

In an alternative embodiment, an operator or the manipulator 29 may have an auxiliary tool to pull information from a database regarding the state of the wear parts. The database may be accessed by an encoding element 55 located on the excavating equipment 1, preferably on a protected area. The encoding element 55 may, for example, be located on the back of the bucket 3 (FIG. 12) or on the earth working machine operating the bucket (not shown). The encoding element may be, for example, an RFID, barcode, or QR Code. In an alternative embodiment not shown, the auxiliary tool may pull information from a mobile data collection device. The encoded mechanism 55 or database may store, for example, the bucket serial number, the capacity of the bucket, the machine the bucket is installed on, the part number for the bucket, and type of wear members 15 currently installed on the bucket 3. The data is then input into the controller 31. The controller 31 with an external Programmable Logic Controller (PLC) (not shown) or an external PC (not shown) may perform a check to ensure that the wear members 15 to be installed are compatible with the bucket 3.

In yet another alternative embodiment, the controller 31 may pull the type of wear members 15 currently installed on the bucket 3 from a bucket health monitoring unit (not shown). The bucket health monitoring unit may be a system that monitors and stores the current wear characteristics of each wear member 15 on the bucket 3 and gives an alert when a wear member 15 is about to be worn past a minimum wear profile for the wear member 15. The alert may be sent wirelessly to equipment operators and to wireless devices when the wear members 15 on the excavating equipment 1 need maintenance. In order to determine the minimum wear profile of each wear member 15 on the bucket, the health monitoring unit may reference a database with various wear profiles for various types of wear members 15. Various aspects of the bucket health monitoring unit may be, for example, accomplished by the Tooth-Wear Monitoring system sold by Motion Metrics or similar bucket health monitoring units or from a mobile data collection device.

In addition to assisting in determining what type of wear members 15 are currently installed on the bucket 3, the bucket health monitoring system may also be able to communicate other information to the tool 25. The communication between the bucket health monitoring system and the tool 25 may be wireless or through a cable. The bucket health monitoring system may communicate, for example, the specific wear member(s) 15 that are worn such that the wear member(s) 15 should be replaced prior to the next maintenance window. The bucket health monitoring system may assist the tool in providing feedback to the tool during the installation and removal process. For example, the bucket health monitoring system may provide information from its sensors (e.g., cameras, accelerometers) to assist the tool in locating and securing the worn wear part and installing a new wear part on the base of the excavating equipment.

In an alternative embodiment, the tool can communicate with the database of the bucket health monitoring system or another separate database to record information about the installation and removal process. The tool can communicate with, for example, at least one of: i) the time and date that the wear parts were removed and replaced, ii) how long the change-out of the wear parts took, iii) machine the wear parts were installed on, iv) type of wear parts replaced and installed, v) torque needed to remove a securement mechanism holding the wear part to the earth moving equipment, vi) torque used to install securement mechanism to hold the wear part to the earth moving equipment, and vii) the geographic location of where the wear parts were replaced.

If the mining excavator 1 is not equipped with a bucket health monitoring unit, an operator may look at the current wear characteristics of each of the wear members 15 and manually input into the controller 31 which wear members 15 need replacement. The controller 31, e.g., a CPU, an external PLC, or an external PC, may also transmit information to wireless devices regarding which wear members 15 are being replaced. If no wear members 15 need to be replaced the controller 31 can be programmed to not continue the removal and installation process.

Figure 13:
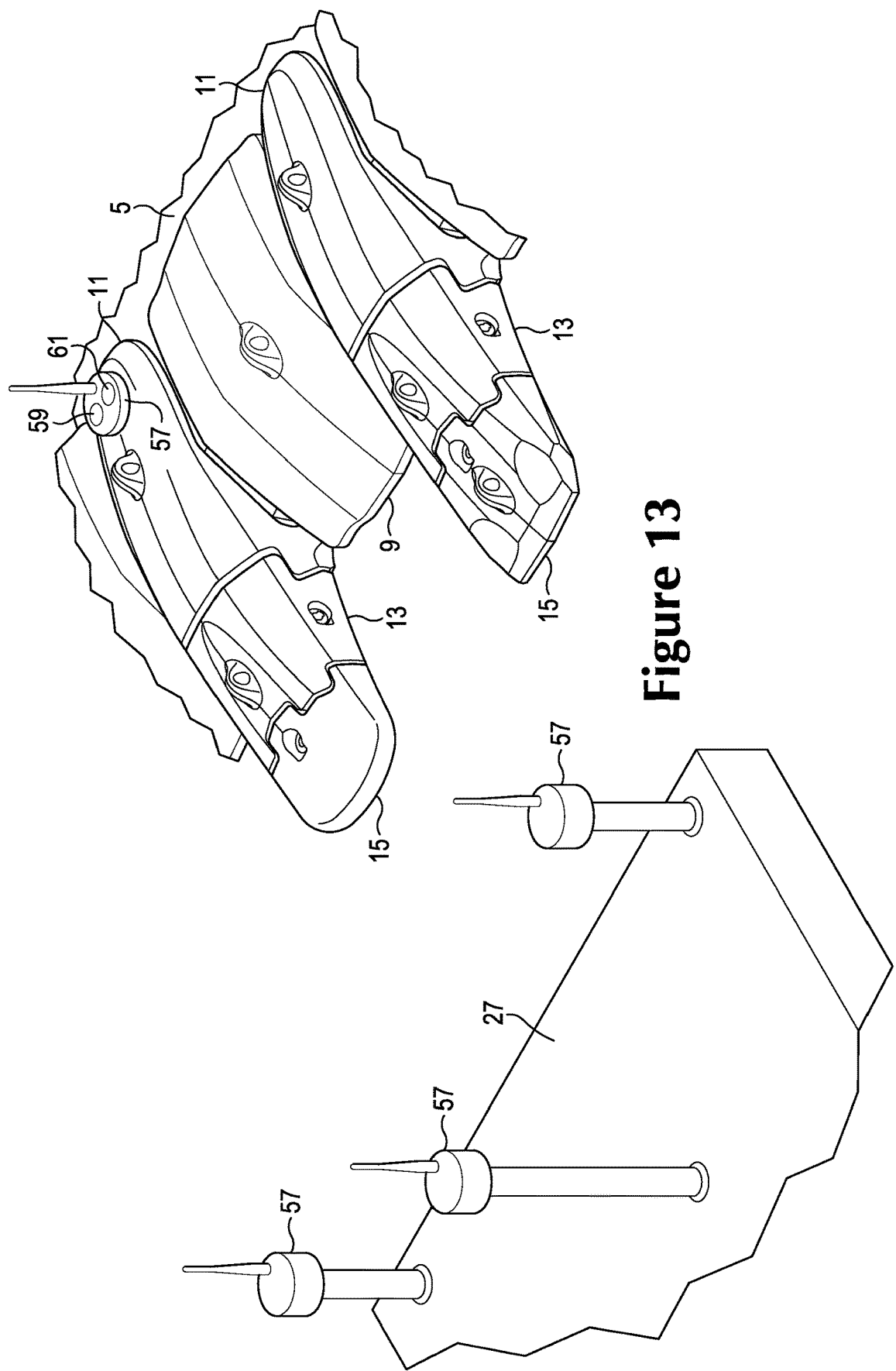
FIG. 13 is a perspective view of the tool of FIG. 7 with receivers and digital sensors. Other details of the tool including the manipulator, storage pallets, and tools are omitted to simplify the drawings.

If one or more wear members 15 need replacement, the controller 31 can determine the location of the wear member 15 with respect to the manipulator 29. The bucket 3 and service vehicle 27 or service station 53 may be equipped with sensors so that the orientation and location of the wear parts may be determined regardless of the wear parts orientation to the ground. The sensors may be active or passive sensors and may be, for example, receivers, transmitters, and digital sensors. The bucket 3 may have the receivers, transmitters, and digital sensors permanently installed on the bucket 3 or the sensors may be placed on the bucket 3 by an operator prior to the removal and installation process. For example, the bucket 3 may have at least one GPS receiver 57 and the service vehicle 27 or service station 53 may also have at least three GPS receivers 57 (FIG. 13). Additional digital sensors, for example an inclinometer unit 59 and/or a compass 61, may be located on a surface of the bucket with a calibrated starting angle so that the controller 31 can determine the orientation and location of the bucket 3 relative to the service vehicle 27 or service station 53. The calibrated starting angle may be, for example, a flat surface of the bucket 3 (e.g., when the bucket 3 is resting on level ground). The controller 31 may have a bucket and wear member geometry database to assist in locating the wear members 15 on the bucket 3. The controller 31 may determine where to maneuver the manipulator 29 based on the tilt angle of the bucket 3, the locations of the service vehicle 27 and bucket 3 determined from the GPS receivers 57, and location of the wear member 15 determined from the bucket and wear member geometry database. In another embodiment, both the bucket 3 and the service vehicle 27 or service station 53 may have electromagnetic wave receivers and/or transmitters, mechanical wave receivers and/or transmitters, or laser receivers and/or transmitters instead of GPS receivers 57. The electromagnetic waves may, for example, have a wavelength greater than the visible spectrum (e.g., infrared, microwave, or Radio Frequency). The mechanical waves may, for example, have a wavelength in the ultrasonic spectrum. The receivers and transmitters may be similar to those used in the Nikon iGPS system or in the iTrack's Local Positioning System.

In an alternative embodiment (FIGS. 27a and 27b), the location of the wear member in space relative to the manipulator may be determined using a camera 32, vision recognition software, and bucket/wear member geometry. For example, the manipulator may be equipped with one or more cameras 32 and the controller (e.g., a CPU, an external PLC, or an external PC) may be equipped with vision recognition software. The manipulator may be spun, rotated, or maneuvered up, down, or in a circle until the vision recognition software identifies the excavating equipment, the bucket, or the wear member. Once the vision recognition software identifies the excavating equipment, the bucket, or the wear member, the controller may determine the orientation and location of the bucket. The manipulator can then be maneuvered closer to the bucket or wear member until the vision recognition software identified a unique feature on the bucket or wear member. The unique feature may be, for example, unique cast surfaces, a uniquely designed weld-on plate, or a unique pattern of hardfacing. The unique feature would preferably be located in a place where it would not wear completely away. The unique feature would preferably have a pattern on the wear member or bucket so that the controller may determine the direction the bucket or wear member is oriented. The manipulator can be driven to the unique feature and a home position on the bucket or wear member would be established. Based on the established home position and bucket/wear member geometry, the manipulator may be maneuvered to various positions needed to remove and/or install wear members on the bucket.

In an alternative embodiment, the location of the wear member 15 in space relative to the manipulator 29 may be input by an operator using a user input device (i.e., a controller 31) to maneuver the manipulator 29 to a specific position on the wear member 15. In this example, the controller 31 is a user input device such as, for example, a joystick or wearable user interface (not shown). Alternatively, an operator can physically (e.g., with their hands) guide the manipulator 29. For example, the operator may maneuver the manipulator 29 so that the manipulator 29 is directly over the securement mechanism 21 between the wear member 15 and the base 13 on the excavating equipment 1 so that the controller 31 is programmed with the wear member 15 location and orientation relative to the manipulator. The operator is preferably remote, i.e., located a safe distance away, from the wear member 15 and the manipulator. If the operator is located in a position where they cannot physically see the wear member 15, the manipulator 29 and service vehicle 27 or service station 53 may be equipped with cameras 32 (FIGS. 27a and 27b) to assist in visually maneuvering the manipulator 29 to the worn wear member 15. The user input device, may also have haptic, visual, or audible feedback to provide information from the manipulator 29. The feedback, for example, may be a vibration, a visual light, or an audible sound. Feedback, for example, may be given to an operator when the manipulator touches an object.

Figure 14:
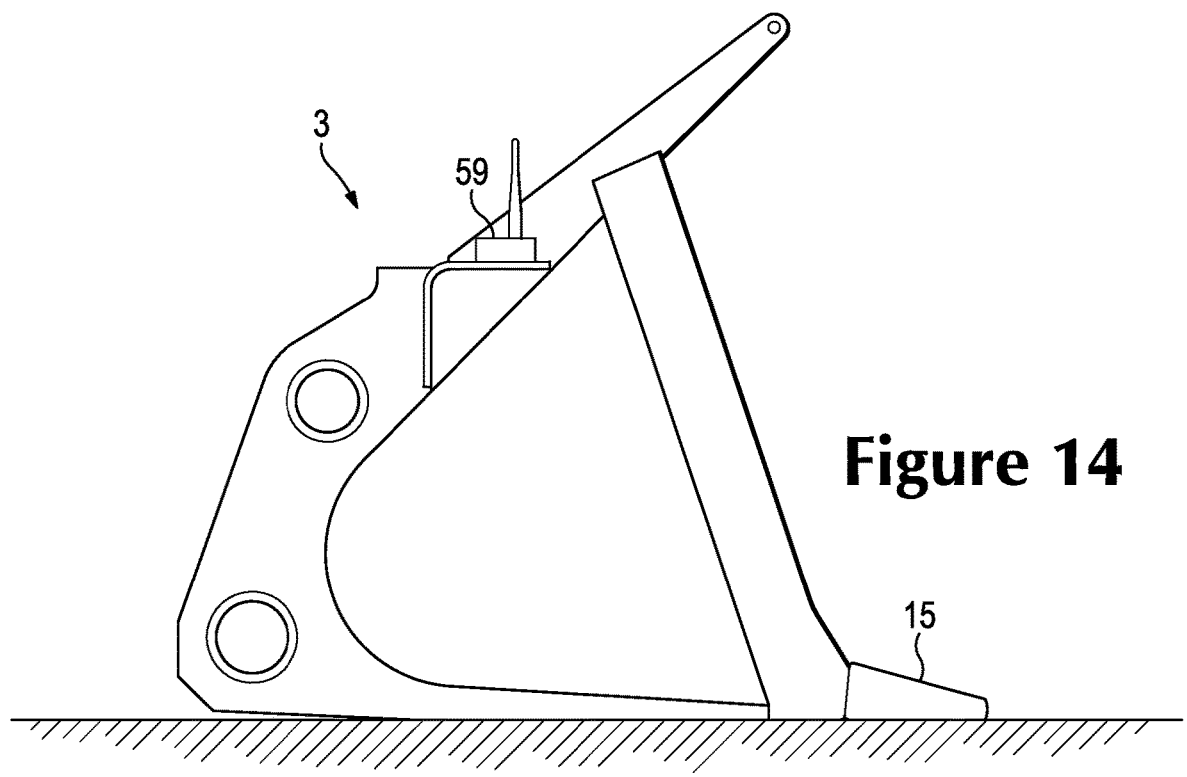
FIG. 14 is a side view of a bucket on level ground with digital sensors in accordance with the present invention.
Figure 15:
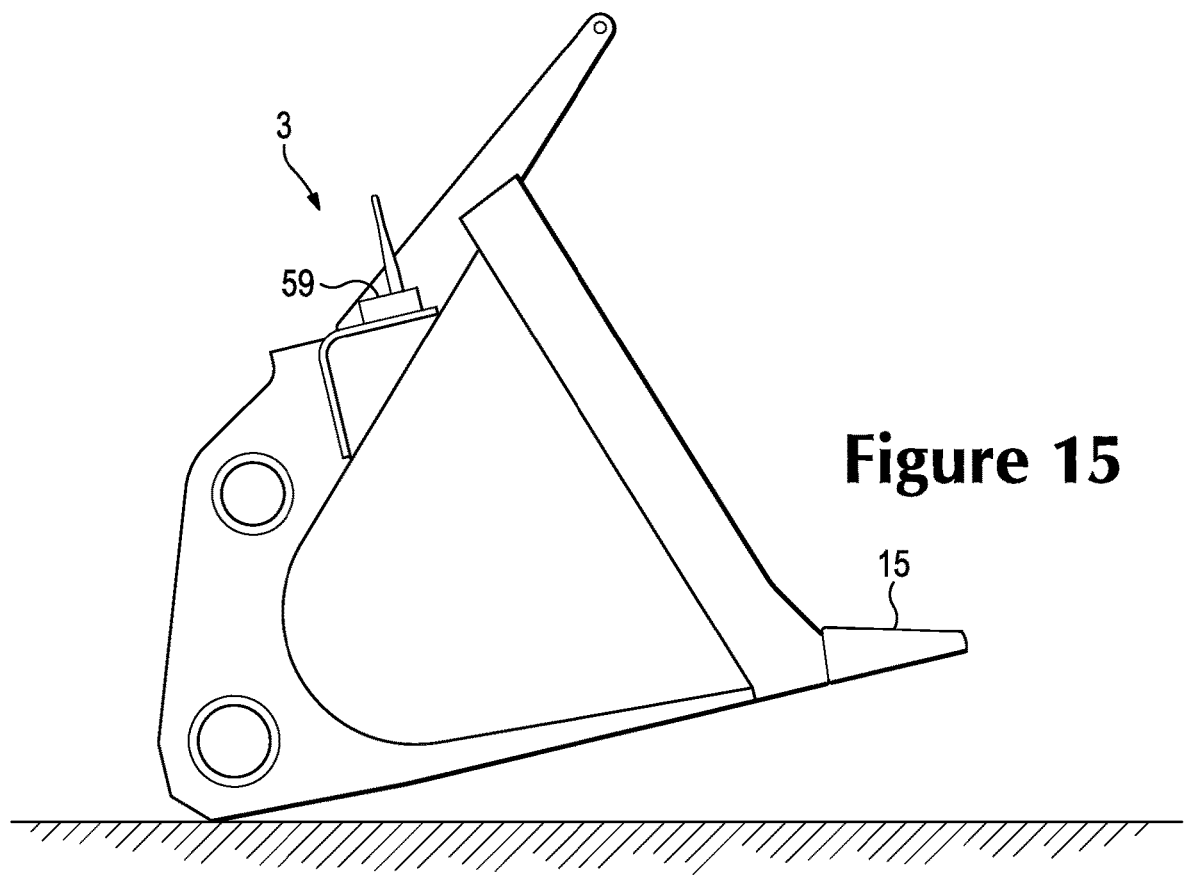
FIG. 15 is a side view of a bucket shown in FIG. 14 with the bucket tilted up for wear part removal and installation.

To ensure that the wear member 15 does not prematurely disengage from the excavating equipment 1, the bucket 3 may be tilted upwards so that the wear member 15 is at an angle for gravity to keep the worn member 15 in place on the base 13. An inclinometer unit 59 located on a surface of the bucket with a calibrated starting angle. The surface of the bucket may be, for example, a flat surface of the bucket 3 (e.g., when the bucket 3 is resting on level ground). The inclinometer unit 59 may wirelessly transmit to the controller 31 the current orientation of the bucket 3 so that the controller 31 can determine when the bucket 3 is in a safe orientation for gravity to keep the worn member 15 in place after the securement mechanism 21 is removed (FIGS. 14 and 15). Alternatively, a light or other audio, visual, or haptic feedback (not shown) may indicate to the operator when the bucket 3 is at a safe orientation to continue the removal process.

Figure 27A:
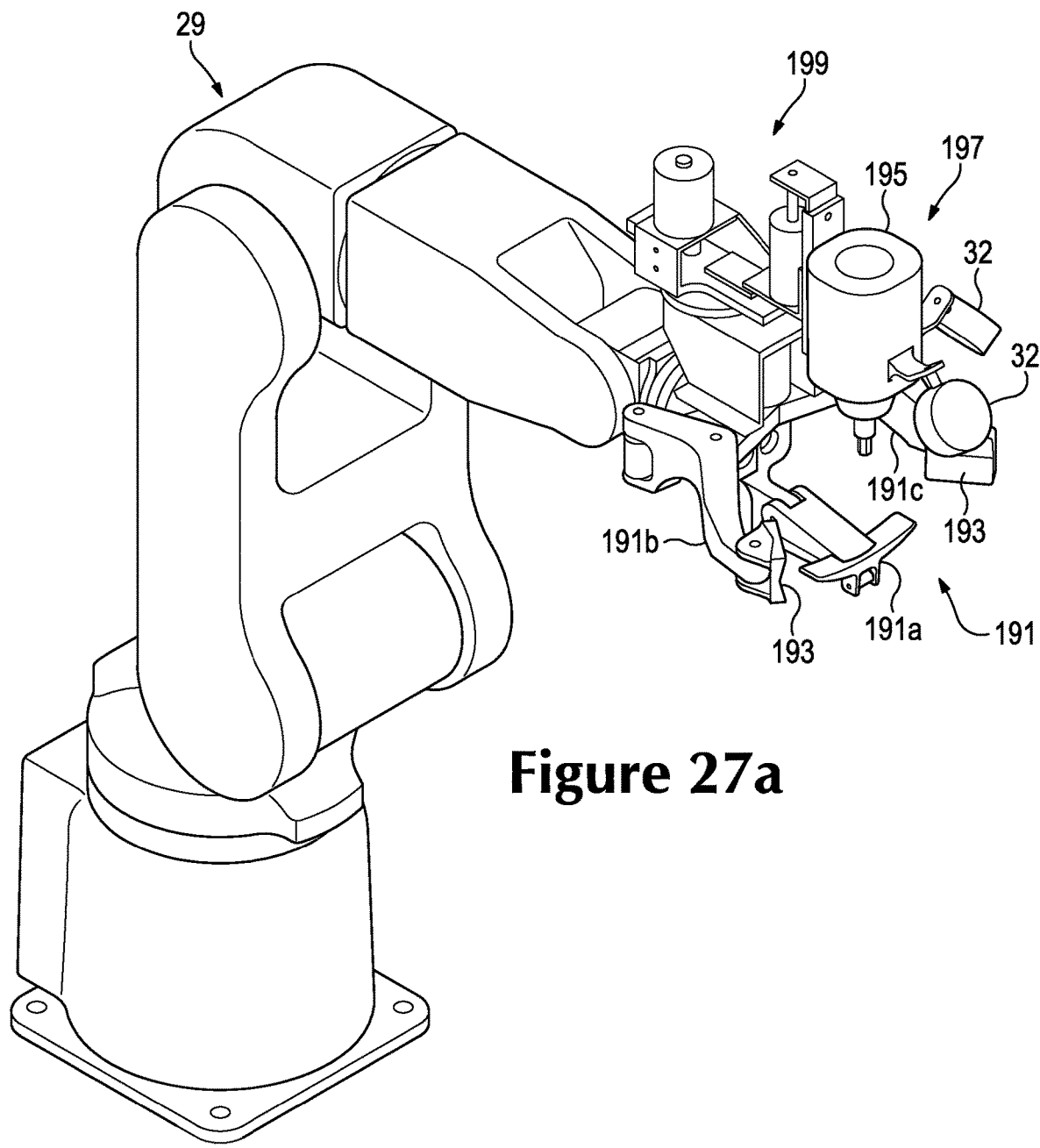
FIG. 27a is a front perspective view of a manipulator with a custom tool for rigidly gripping the wear parts and for removing the securement mechanism in accordance with the present invention.
Figure 27B:
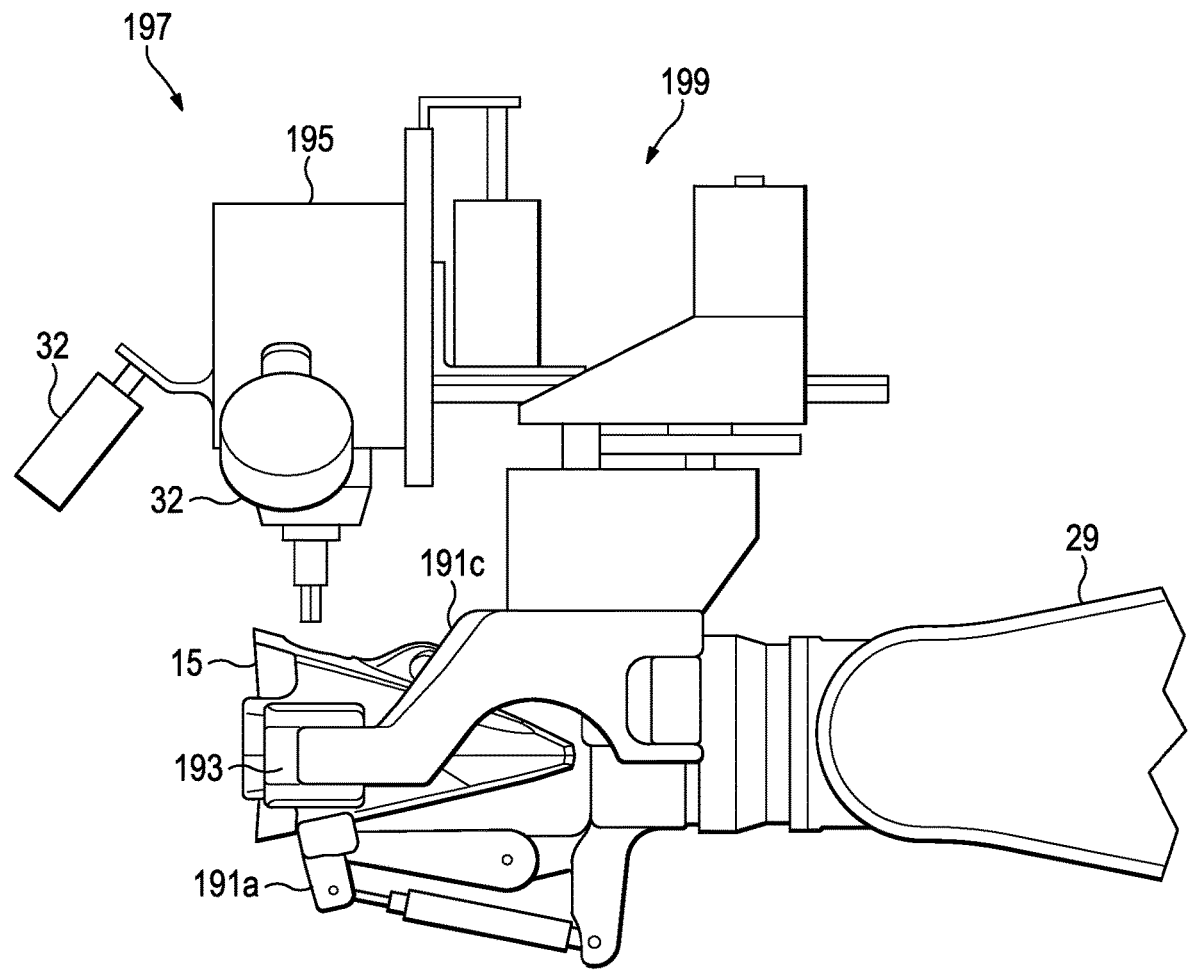
FIG. 27b is a front side view of the custom tool shown in FIG. 27a holding a wear part.

In an alternative embodiment, an auxiliary tool, preferably in the form of a multi-arm tool 191, may secure the wear member on two or more sides of the wear member 15 (FIGS. 27a and 27b). In the illustrated example, auxiliary tool 191 has three arms, one arm 191a that contacts the bottom of the wear member 15 and two arms 191b and 191c that contact the sides of the wear member 15, although the multi-arm tool 191 could be provided with more than three arms or fewer than three arms. In addition, the multi-arm tool 191 may grip any two opposing surfaces on the wear member (e.g., the arms may grip the top and bottom of the wear member, the arms may grip the sides of the wear member and the top of the wear member, or the arms may grip the top and bottom and the sides of the wear member). Each arm 191a-191c can be opened and shut so that the side arms 191b and 191c move from side to side and move closer and farther apart from each other and the bottom arm 191a moves up and down. The arms may be moved via a motor or may be moved hydraulically. The arms 191a-191c are spaced far enough apart so that when the arms are in the open position the wear member fits within the opening provided by the arms and are likewise spaced close enough to each other so that when the wear member is within the opening the arms fully contact and engage the wear member. Each arm 191a-191c additionally may have an adjustable surface 193 to contact the wear member 15. Adjustable surface 193 allows the arms 191a-191c to better contact the varying surfaces of the wear member. In addition the adjustable surface 193 allows the arms 191a-191c to better contact a worn wear member.

In one preferred embodiment, the multi-arm tool 191 is combined with a second auxiliary tool in the form of a removal tool 195 to create a combined tool 197 that both secures the wear member 15 and that can remove the securement mechanism from the wear member 15. This operation can also be accomplished by a single auxiliary tool with multiple capabilities. In the illustrated embodiment, the removal tool 195 is provided with an adjustment mechanism 199 that only adjust the position of the removal tool 195 without adjusting the overall position of the manipulator 29 (i.e., the manipulator has fine control). Although the adjustment mechanism 199 is only shown in the embodiment shown in FIGS. 27a and 27b, the adjustment mechanism 199 may be applied to any of the various auxiliary tools 41 used in the removal and installation process. The adjustment mechanism 199 provides the removal tool 199 with two or more degrees of freedom so that the removal tool 195 can move from side to side and up and down without adjusting the position of the manipulator arm 29. The removal tool 195 is shown as having a hex tool 201, though other tools are possible, to remove the securement mechanism. Combining the multi-arm tool 191 with the removal tool 195 allows one tool 197 to be used to remove the worn wear member and install the new wear member. An auxiliary tool in the form of a combined tool 197 may combine any of the various auxiliary tools 41 that secures the wear member and any of the various auxiliary tools 41 that removes and installs the securement mechanism from the wear member. In addition the auxiliary tool as a combined tool 197 may combine more than two auxiliary tools together (e.g., the combined tool may have an auxiliary tool to secure the wear member, an auxiliary tool to remove fines, and an auxiliary tool to remove the securement mechanism).

Figure 16:
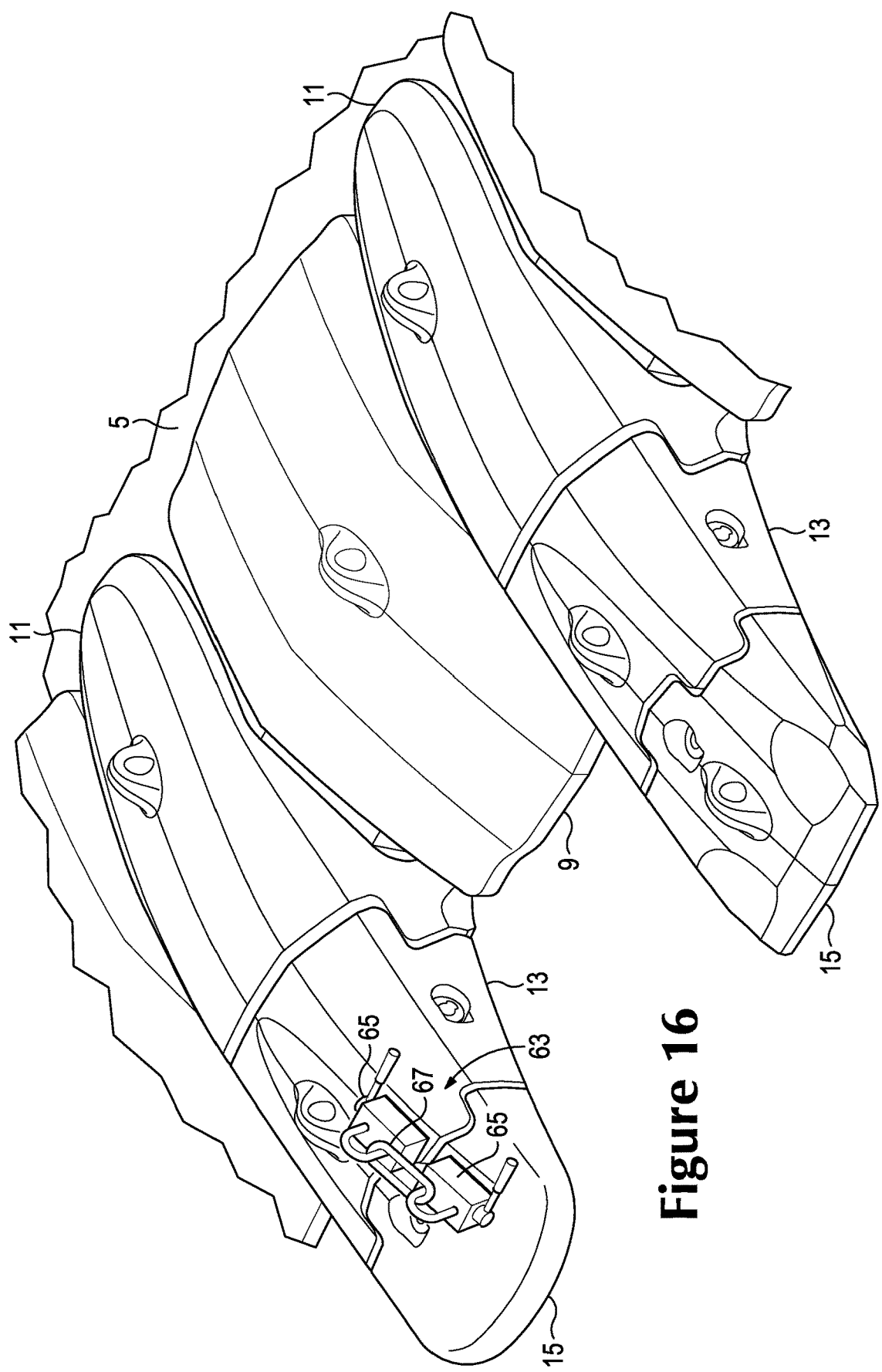
FIG. 16 is a perspective view of a magnetic strap attached to a wear member and base in accordance with the present invention.

In an alternative embodiment, a magnetic strap 63 may secure the wear member to the base (FIG. 16). The magnetic strap 63 may be made of at least one air actuated permanent magnet 65. At least one air actuated permanent magnet 65 may be secured to the worn wear member 15 and another air actuated permanent magnet 65 may be secured to the base 13 and both of the air actuated permanent magnets 65 may be secured to each other, for example, with a metal strap 67. The magnetic strap 63 may be applied manually or may be applied with the manipulator 29. The air actuated permanent magnets 65 may, for example, be Optimag Pneumatic Lifting Magnets, SAV 531.03 NEO-AIR 500 magnets, SCHUNK Lifting Magnets MHM-P, or similar commercially available air actuated permanent magnets.

Figure 17:
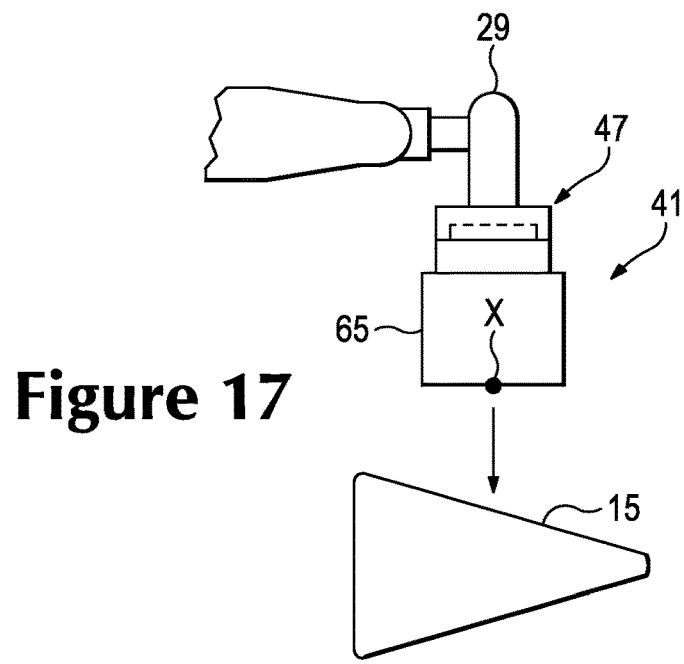
FIG. 17 is a side view of a manipulator and an air actuated permanent magnet for securing wear parts and securement mechanisms in accordance with the present invention.

In yet another alternative embodiment, two (or more) manipulators 29 (not shown) may be used. A first manipulator can be used to secure the wear member 15 from falling and a second manipulator can be used to disengage the wear member 15 from the excavator (not shown). The first manipulator may use a tool such as an air actuated permanent magnet 65 to secure the wear member 15 (FIG. 17). The controller 31 drives the manipulator 29 and the air actuated permanent magnet 65 to the programmed location X just above the wear member 15. Next, the manipulator 29 and air actuated permanent magnet 65 can be driven further toward the wear member 15 until the force feedback on the manipulator 29 registers a spike in force. The air actuated permanent magnet 65 can then be engaged to secure the wear member 15.

Figure 18A:
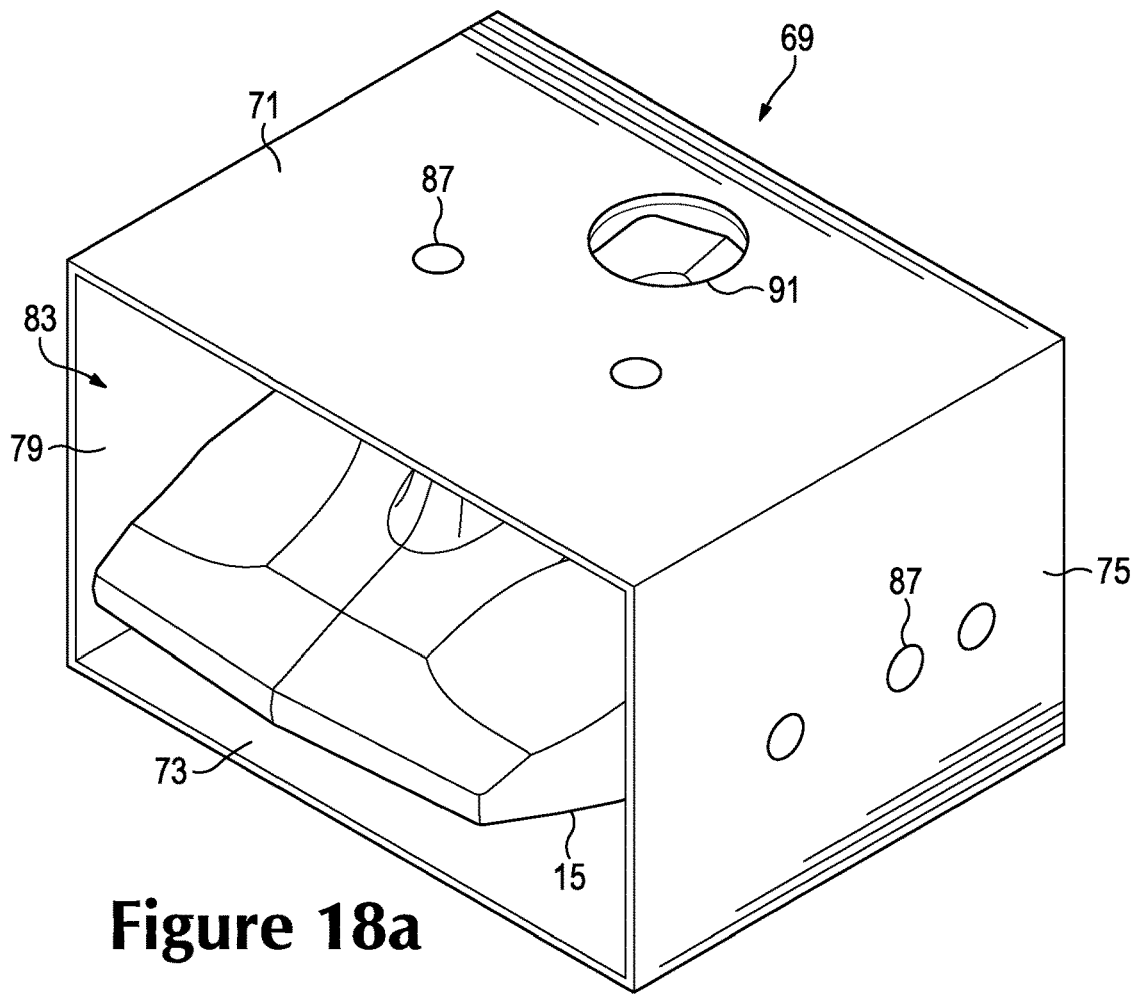
FIG. 18a is a perspective view of a cartridge housing a new wear part in accordance with the present invention.
Figure 18B:
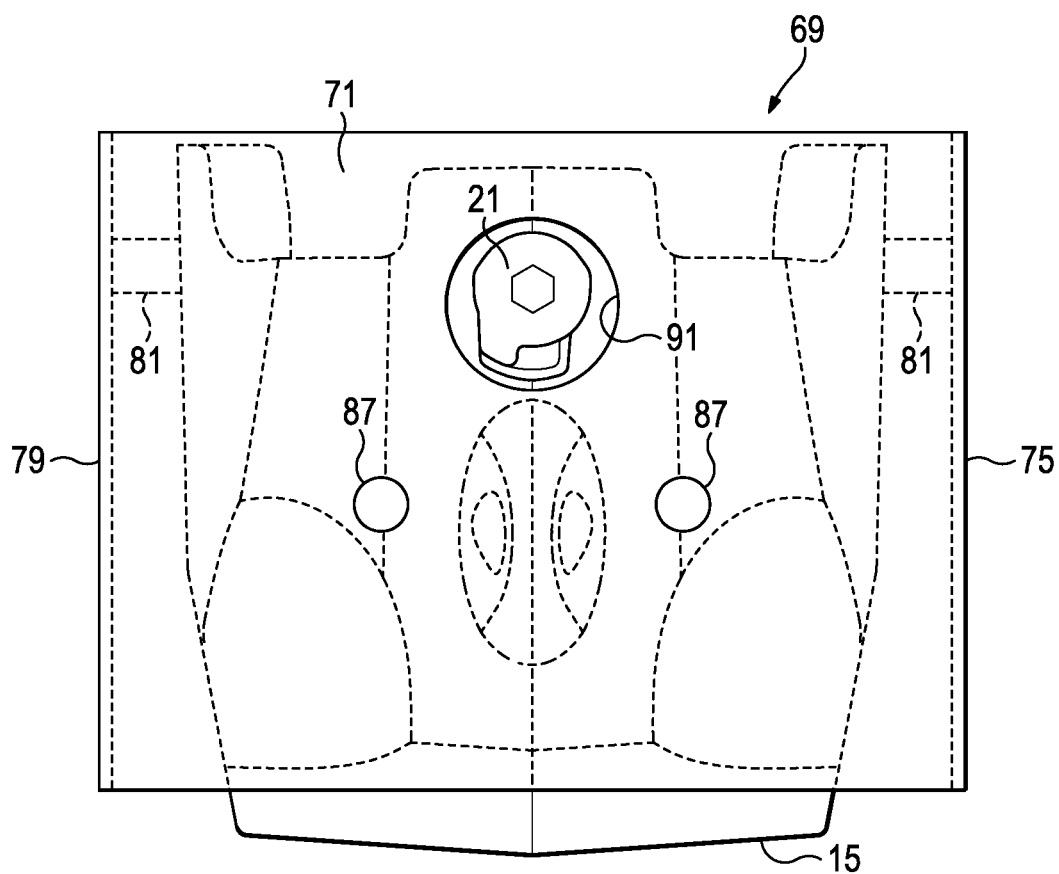
FIG. 18b is a top view of the cartridge shown in FIG. 18a with portions of the wear part and the inside of the cartridge shown in phantom lines.
Figure 18C:
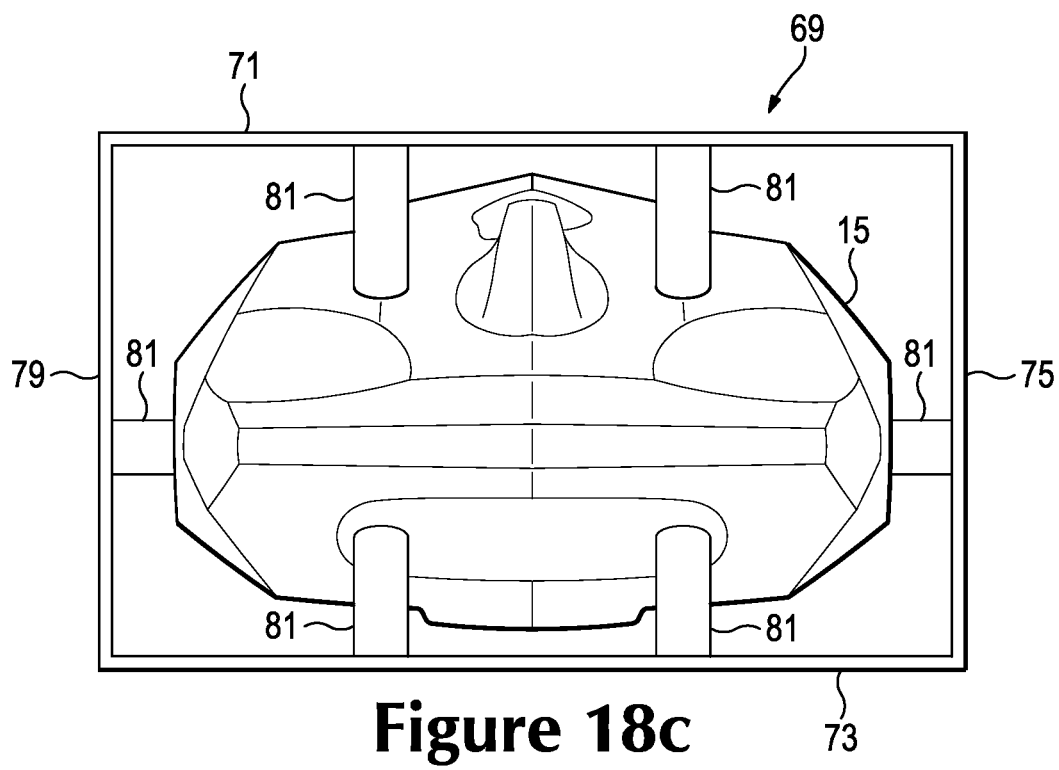
Figure 18D:
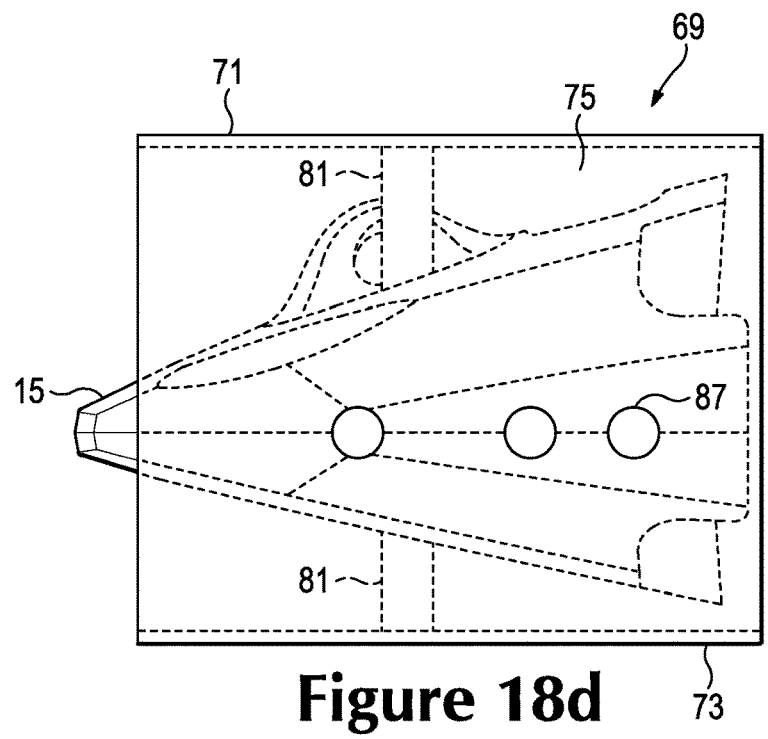
FIG. 18d is a side view of the cartridge shown in FIG. 18a with portions of the wear part and the inside of the cartridge shown in phantom lines.
Figure 18E:
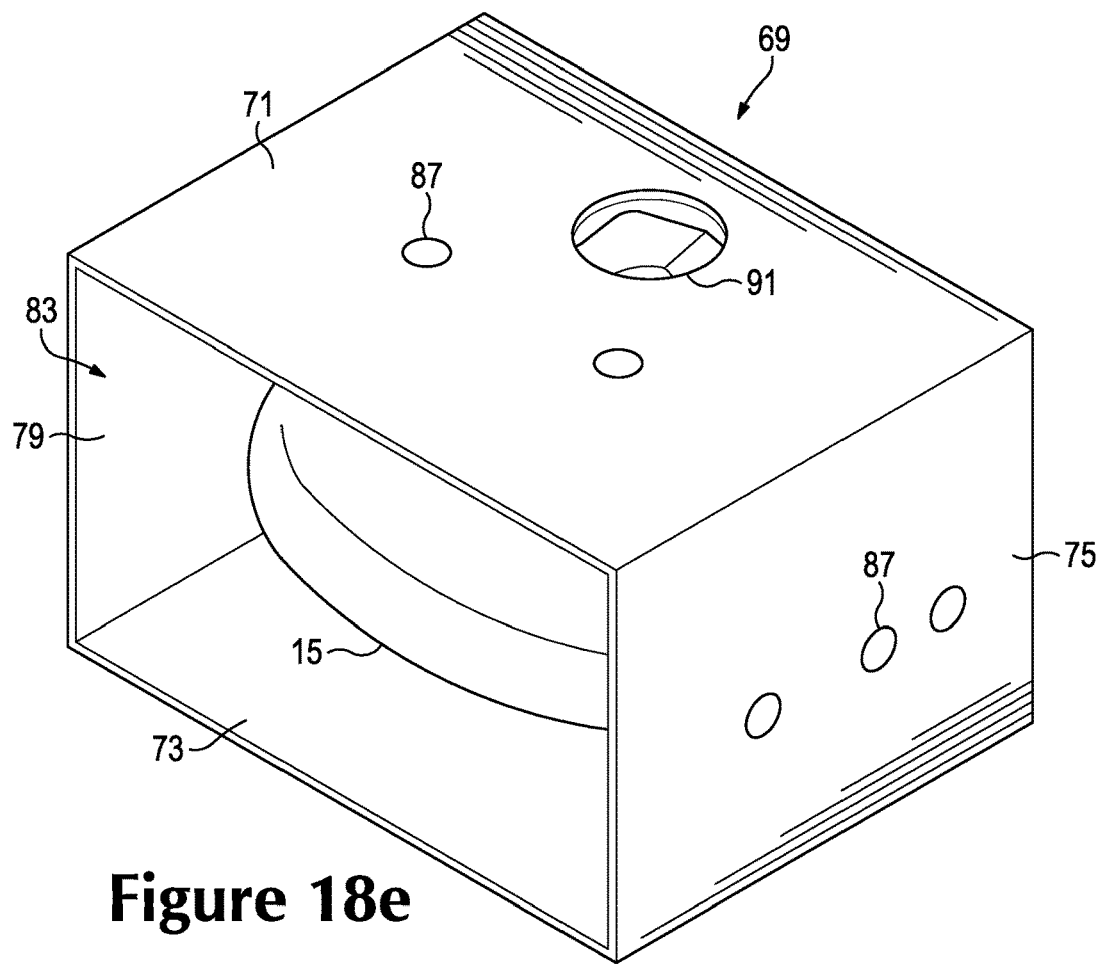
FIG. 18e is a perspective view of a cartridge housing a worn wear part in accordance with the present invention.
Figure 18F:
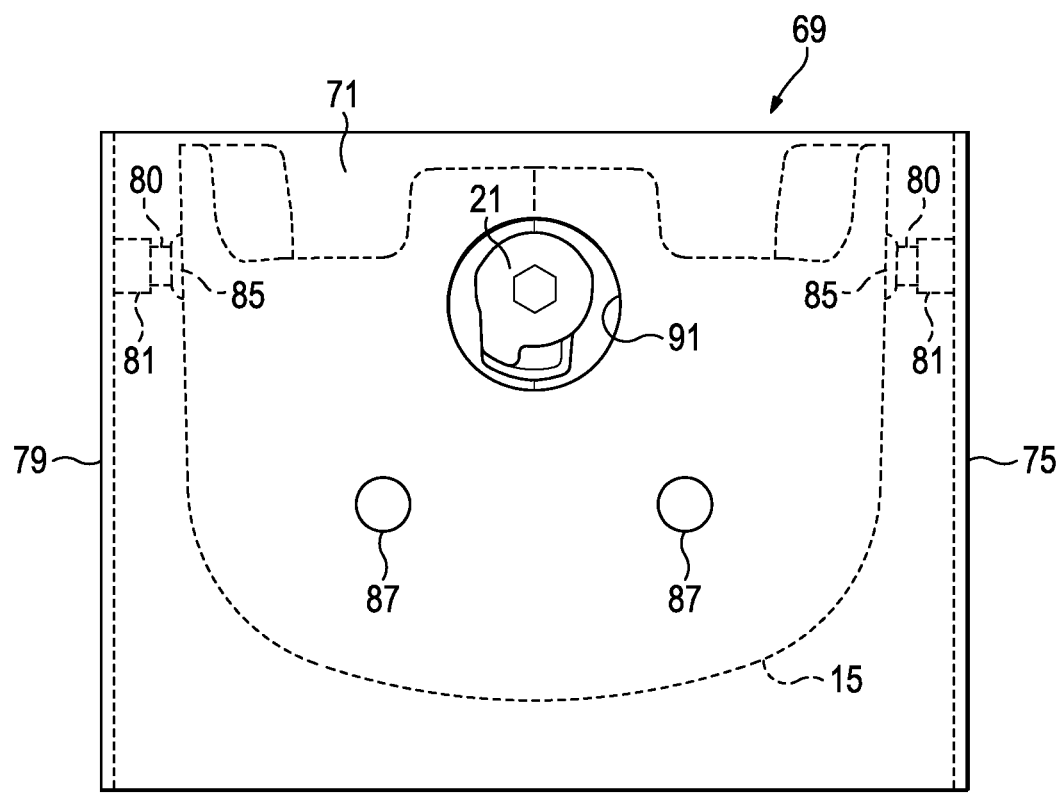
FIG. 18f is a top view of the cartridge shown in FIG. 18e with portions of the wear part and the inside of the cartridge shown in phantom lines.
Figure 18G:
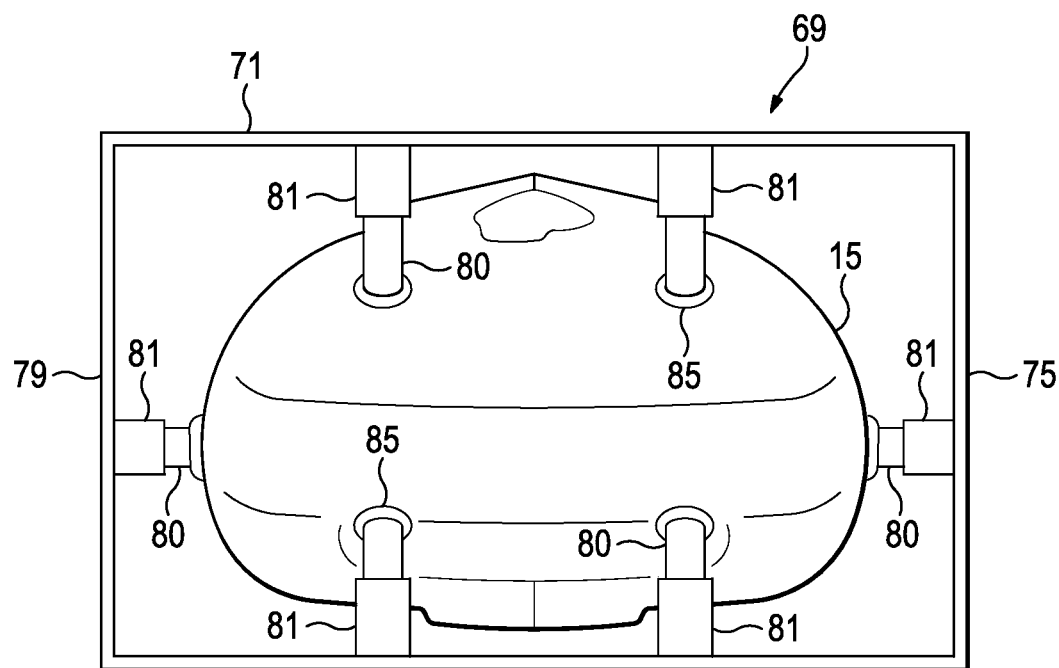
FIG. 18g is a front view of the cartridge shown in FIG. 18e.
Figure 18H:
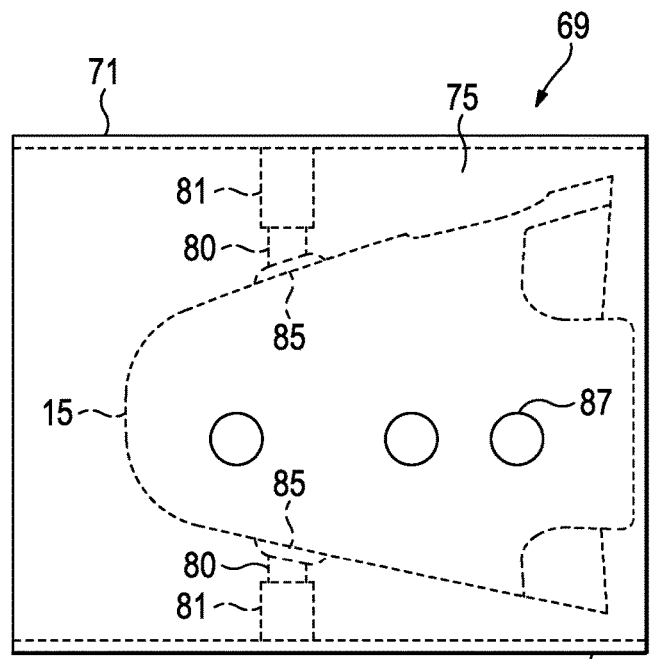
FIG. 18h is a side view of the cartridge shown in FIG. 18e with portions of the wear part and the inside of the cartridge shown in phantom lines.
Figure 19A:
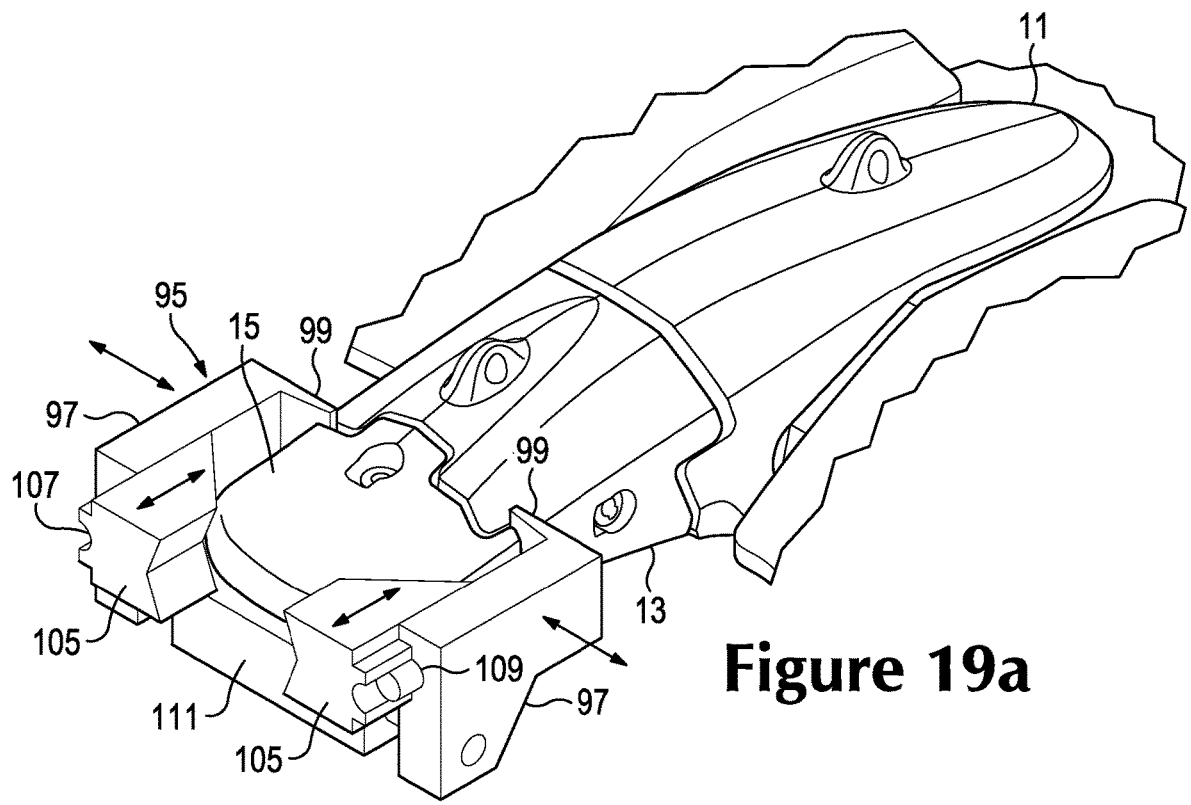
FIG. 19a is a perspective view of a multi-jaw gripper for securing a wear part in accordance with the present invention.
Figure 19B:
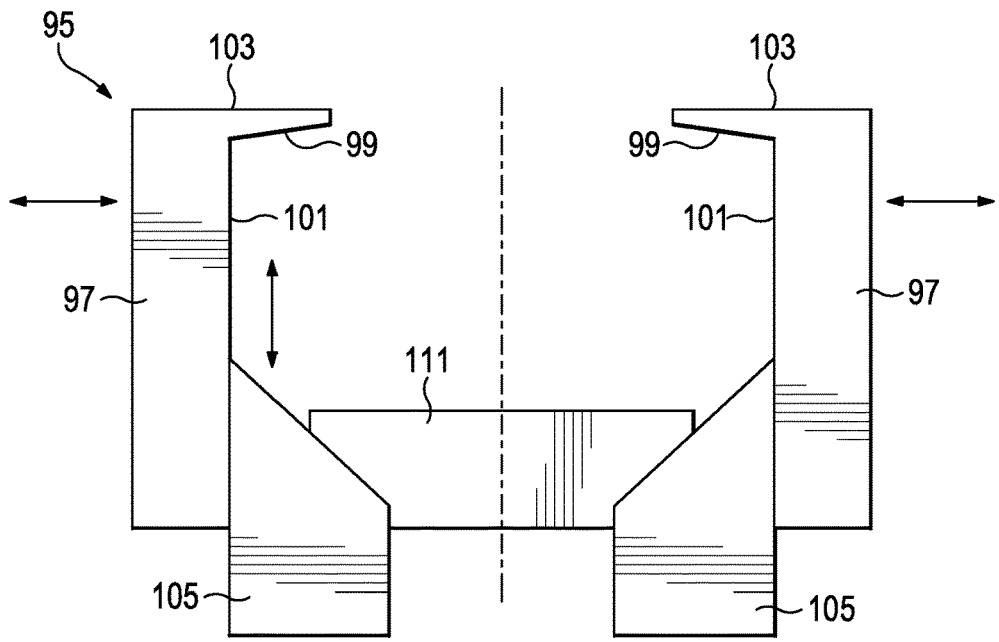
Figure 19C:
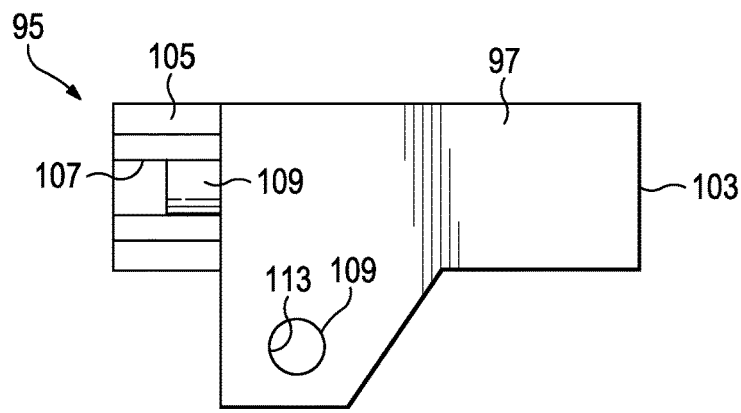
Figure 19D:
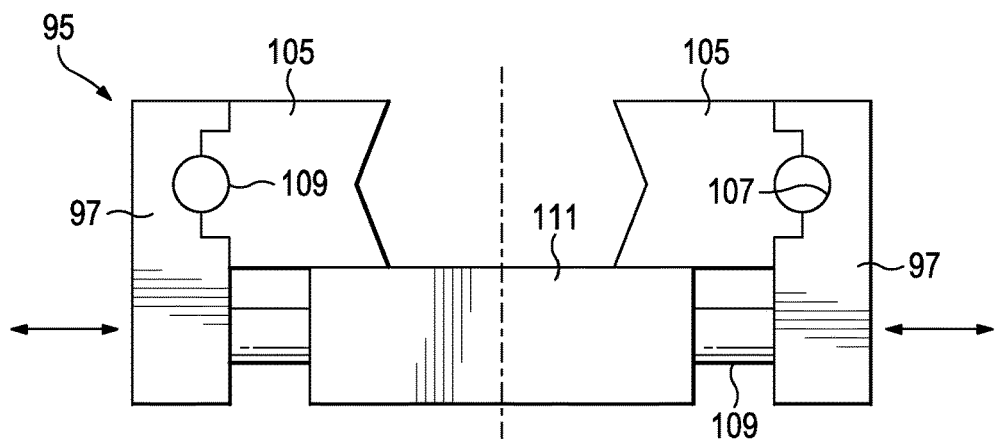

In an alternative embodiment, a cartridge 69 may be used to secure the wear member 15 (FIG. 18e-18f). The cartridge 69 has a top wall 71, bottom wall 73, and two opposing sidewalls (75, 79) extending between the top wall 71 and the bottom wall 73. Guides or locators 81 on the interior surface 83 of the cartridge 69 may assist in properly positioning the wear member 15 within the cartridge 69. The locators may be an additional piece secured to one of the walls or the locator may be an integral part of one of the walls. The locators may be sensors that indicate when the wear member is properly positioned within the cartridge. The locators 81 may be on the interior surface 83 of the top wall 71, the bottom wall 73, the first sidewall 75, the second sidewall 77, or a combination thereof. In addition to the cartridge 69 being able to house a worn wear member 15 for removal, storage, and shipment; the cartridge 69 may also be used to house new wear members 15 for shipment, storage, and installation (FIGS. 18a-18d). However, the cartridge may only be used for housing worn wear members, or may only be used for housing new wear members. The uniform shape of the cartridge 69 allows the wear member 15 to be stored and shipped more easily. The locators 81 may be, for example, hollow so that studs 80 may be inserted into the locators 81. The studs 80 may have a resilient member so that the studs may be pushed further into the locators when the studs 80 engage the wear member 15. In an alternative embodiment not shown, the locators 81 may be resilient so that the locators engage the wear member as the wear member is inserted into the cartridge. For example, the locator may be a cutout of a part of one of the walls of the cartridge so that the cutout creates a tab that extends into the cavity of the cartridge to engage the wear member (not shown). The worn wear member 15 may be stud welded, or otherwise secured 85, to the studs 80 and/or the locators 81 for additional support, but this is not a requirement and the studs or locators may be sufficient to hold the wear member in position. The stud weld 85 may be performed by an operator or may be performed using the manipulator 29. The walls 71, 73, 75, and 79 of the cartridge 69 may be provided with at least one attachment mechanism 87 for securing the cartridge 69 to a lifting device. The attachment mechanism may, for example, be a lifting eye, an air actuated permanent magnet, or one or more holes in, e.g. the sidewalls 75, 79. The lifting device, for example, may be a hoist or manipulator 29. In an alternative embodiment, the earth moving equipment may be brought to the cartridge 69. The walls 71, 73, 75, and 79 of the cartridge 69 may have an opening 91 so that the securement mechanism 21 between the wear member 15 and the base 13 is accessible once the cartridge 69 is installed on the wear member 15. The attachment mechanism 87 may also be used for lifting the cartridge 69, for rotating the cartridge 69, for pulling the cartridge 69, or for pushing the cartridge 69. An attachment mechanism 87 that can be lifted, pulled, or pushed allows a wear member 15 secured within the cartridge 69 to be installed and removed from the base 13 while being secured to the manipulator 29. The cartridge 69 in combination with the attachment mechanism 87 may eliminate the need for a lifting eye on the wear member 15. Eliminating the lifting eye on wear member 15 could minimize the manufacturing rejects of wear members 15. In an alternative embodiment, at least one attachment mechanism 87 is provided for securing the cartridge 69 and at least one additional attachment mechanism 87 is provided for lifting, pulling, and pushing.

Multiple cartridges 69 and new wear members 15 could be housed, stored, shipped, and transported in a storage stall 39 from the time the wear members 15 leave manufacturing to the time the wear members 15 are installed on the excavating equipment 1. Multiple cartridges 69 and worn wear members 15 could be housed, stored, shipped, and transported in a storage stall 39 from the time the wear members 15 are removed from the excavating equipment 1 to the time the wear members 15 are refurbished, reclaimed, or scrapped. In an alternative embodiment, the cartridges 69 may be placed within a storage stall 39 in a magazine formation so that when one cartridge is taken from the storage stall the remaining cartridges slide to a new location such that a new cartridge is ready for removal from the storage stall 69 (FIGS. 10a and 10b). Once a cartridge 69 is used to remove a worn wear member 15, the cartridge 69 with the worn wear member 15 may be placed back in the same storage stall 39 or may be placed in a different storage stall 39 (FIG. 10C).

Alternatively, one manipulator with a first arm to secure the wear member 15 from falling and a second arm to disengage the wear member 15 from the excavator may be used (not shown). The first arm may use a multi-jaw gripper 95 to secure the wear member 15 to the manipulator (FIGS. 19a-19d). The multi-jaw gripper 95 can have two outer arms 97 that oppose each other. Each outer arm 97 has a wedge 99 that extends from an inner surface 101 and along the rear surface 103 of each arm 97. Each outer arm 97 has an inner wedge 105 that can slide along the inner surface 101. A cavity 107 extends between the outer arm 97 and the inner wedge 105. A sliding mechanism 109 is inserted into each cavity 107. The sliding mechanism may be, for example, a screw, a pneumatic cylinder, or a hydraulic cylinder. Each outer arm 97 is secured to a support 111 that extends between each opposed outer arm 97. A cavity 113 extends from one outer arm 97 through the support 111 and through the other outer arm 97. A sliding mechanism 109 is inserted into the cavity 113 so that the opposing arms are able to slide together and apart. To attach the multi-jaw gripper 95 to a wear member 15 the manipulator 29 slides the outer arms 97 apart from each other and the manipulator 29 slides the inner wedges 105 away from the from the rear surface 103. The manipulator places the multi-jaw gripper 95 over the wear member 15 and slides the opposed outer arms 97 together so that each rear surface 103 and each wedge 99 fits between the wear member 15 and the base 13. In this position each rear surface 103 abuts the base 13 and the wedge 99 abuts the wear member. Next the manipulator 29 slides each inner wedge 105 towards the rear surface 103 until the inner wedges 105 abut the front end 19 of the wear member 15. Wear member 15 is now secured and ready for the securement mechanism 21 to be removed from the wear member 15.

Figure 20A:
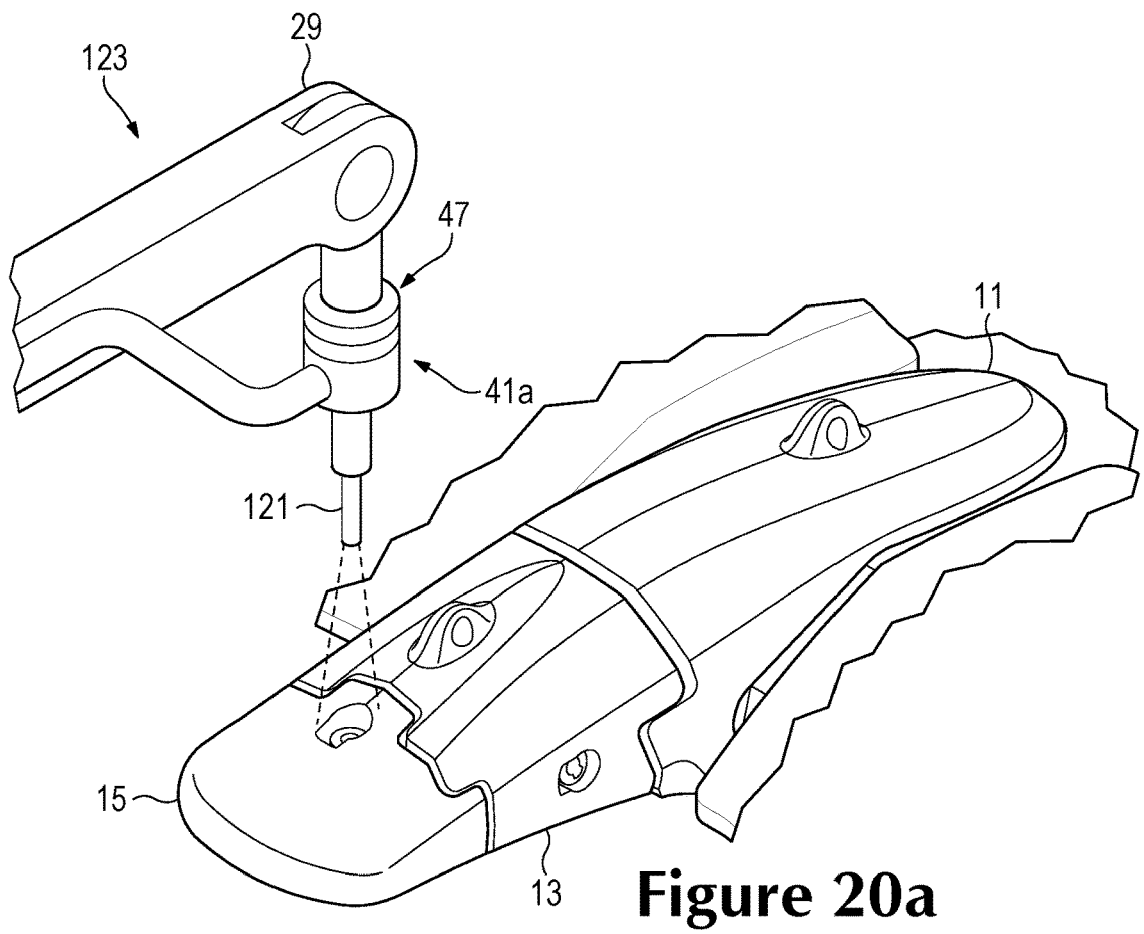
FIG. 20a is a perspective view of a pressure washing system for removing fines in accordance with the present invention.
Figure 20B:
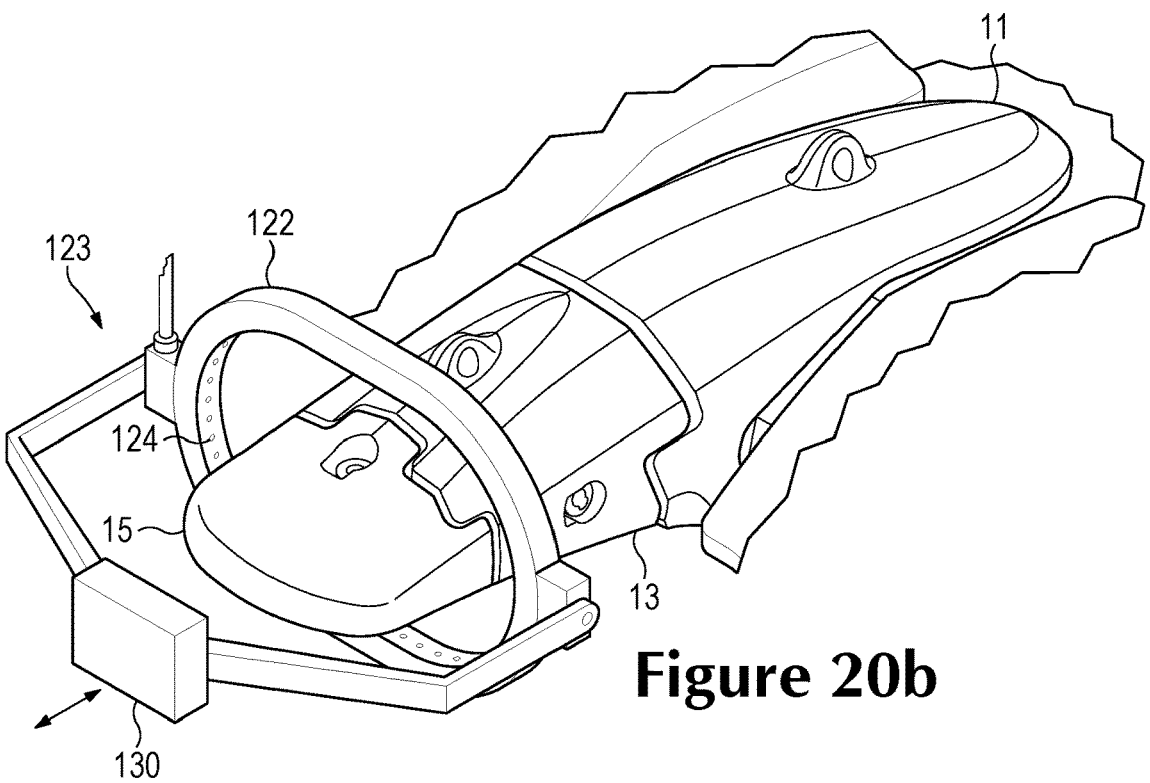
Figure 20C:
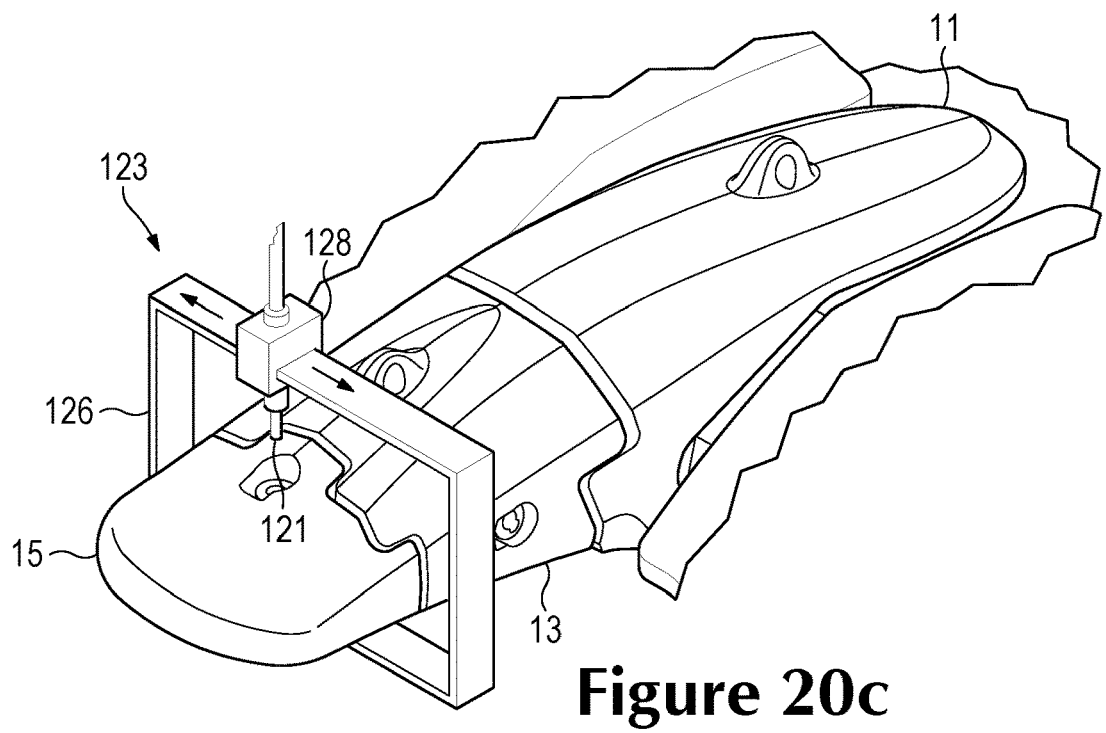

If the mining excavator 1 is used in an environment that creates fines that build up between the wear member 15 and the base 13 and the area surrounding the securement mechanism 21, an auxiliary tool 41a for dislodging the fines may be utilized. The auxiliary tool may be used manually by an operator or may be used with the manipulator 29. For example, a common tool currently used in the mining industry for removing fines may be utilized. The common tool may be, for example, a pneumatic needle scaler (not shown) or may be a pressure washing system. For example, a nozzle 121 for a pressure washing system 123 may be provided that attaches to the manipulator 29 (FIG. 20a). The pressure washing system 123 is shown as having one nozzle 121, but may have more than one nozzle 121. The pressure washing system 123 may use a cleaning agent such as air with or without suspended abrasive grains or water to remove the fines. In an alternative embodiment, the pressure washing system 123 may utilize a ring nozzle 122 with many inwardly facing orifices 124 around the ring to deliver the cleaning agent (FIG. 20b). The ring nozzle 122 creates a sheet of cleaning agent around the wear member 15. The ring may be provided with a securement fixture 130 for fixing the ring to a tool changer 47 (FIG. 8). The manipulator 29 may sweep the ring nozzle 122 along the longitudinal axis of the wear member 15. In an alternative embodiment, the pressure washing system 123 may utilize a frame 126 with a sliding carriage 128 mounted to the frame 126 (FIG. 20c). The sliding carriage would be able to slide back and forth along the frame 126 as the cleaning agent is dispersed from the nozzle 121 on the sliding carriage 128. The frame 126 may be provided with a securement fixture (not shown) similar to the securement fixture 130 used with the ring nozzle 122 in FIG. 20b. The manipulator may sweep the frame 126 along the longitudinal axis of the wear member 15.

Figure 21:
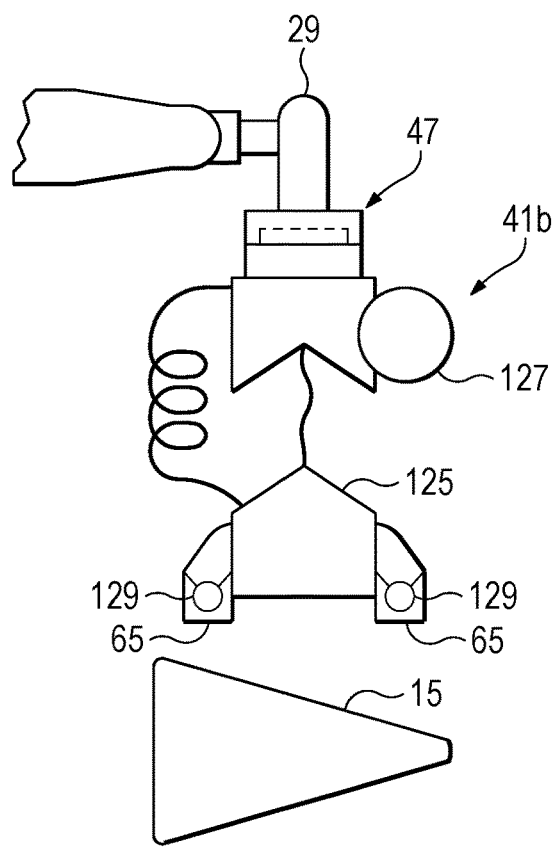
FIG. 21 is a side view of a vibrator for removing fines from wear parts in accordance with the present invention.

In an alternative embodiment, an auxiliary tool 41b including a vibrator 125 may be used to dislodge the fines from the wear member 15. For example, the manipulator 29 may be used to lower a vibrator 125 onto the worn wear member 15 with a winch 127 (FIG. 21). The vibrator 125 is isolated so that the vibrations do not cause damage to the manipulator 29. In alternative embodiments not shown, the tool may not have a winch 127 and the vibrator 125 may be isolated from the manipulator 29, for example, with an air spring or a rubber bladder to ensure the vibrations do not damage the manipulator 29. The vibrator 125 may be a CDX Explosion Proof Electric Vibrator or similar commercially available vibrators. At least one air actuated permanent magnet 65 may be mounted to the vibrator 125 with a swivel mount 129. The air actuated permanent magnet 65 may be an Optimag Pneumatic Lifting Magnet, SAV 531.03 NEO-AIR 500, SCHUNK Lifting Magnet MHM-P, or similar commercially available air actuated permanent magnet. The swivel mount 129 allows the air actuated permanent magnet 65 to orient to the wear members 15 outer surface.

Figure 22A:
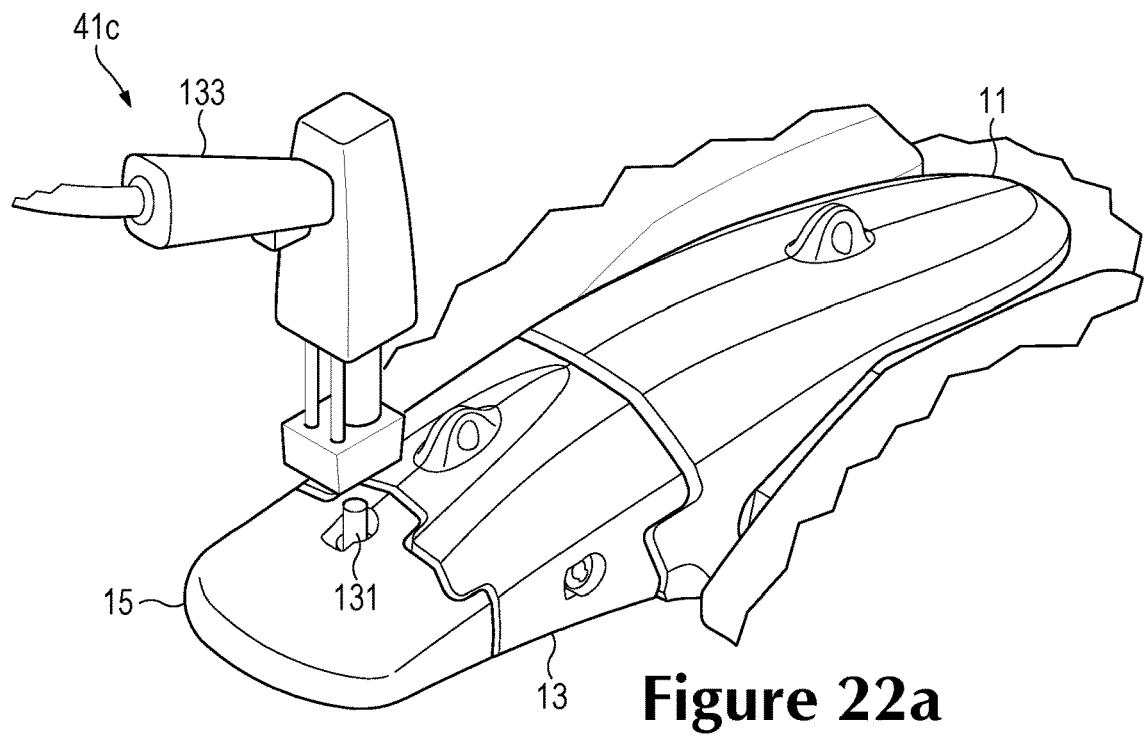
FIG. 22a is a perspective view of a stud welder for attaching new pieces to assist in removing wear parts in accordance with the present invention. The manipulator and tool changer are omitted to simplify the drawing.
Figure 22B:
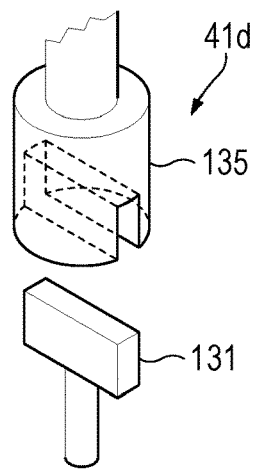
FIG. 22b is a perspective view of a wrench bit for rotating new pieces that have been attached to the wear parts in accordance with the present invention.

To disengage the securement mechanism 21 between the wear member 15 and the base 13, the manipulator 29 may utilize an auxiliary tool 41c to attach a gripping member or piece 131 to the lock 21. For example, the manipulator 29 and an auxiliary tool 41c to attach gripping member 131 to the lock 21 are driven to a programed location just above the wear member 15. The programed location may be manually input via user input device as outlined above, or may be determined via receivers and bucket geometry as outlined above. Next the manipulator 29 is driven further toward the wear member 15 along the axis of the lock 21 until the force feedback on the manipulator 29 registers a spike in force indicating that the auxiliary tool 41c is touching the wear lock 21. The auxiliary tool 41c then attaches gripping piece 131 to the lock 21. Attaching a piece to the lock 21 allows the manipulator 29 to not require precise alignment with the lock 21 for removal. The gripping piece may have a variety of different shapes and may be, for example, a cylindrical stud, a splined stud with a ring groove, a T-shaped stud, an L-shaped stud, or a bladed stud. The manipulator 29 may switch to another auxiliary tool 41d to remove the lock. The auxiliary tool 41c for attaching piece 131 may be, for example, a stud welder 133, and the auxiliary tool 41d to remove the lock 21 may be, for example, an pneumatic or hydraulic wrench 135 matching the shape of the stud 131 (FIGS. 22*a* and 22*b*). The gripping member 131 can also be attached by mechanical means. In the given example, the lock 21 has a threaded pin which can be released by turning the pin with the pneumatic or hydraulic wrench. Other attachments or auxiliary tools could be used for other kinds of locks. The manipulator 29 may switch to another auxiliary tool and go back to the programed location of the piece or stud 131 to grip the stud 131 and dispose of the lock 21 in a disposal stall 137 located on the service vehicle 27 or in the service station 53.

Figure 23:
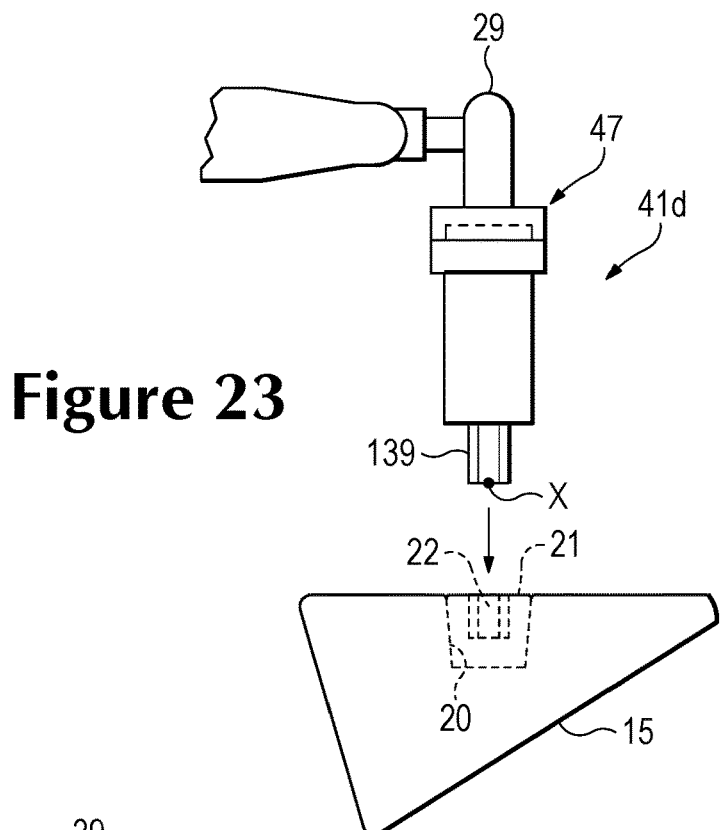
FIG. 23 is a side view of a hex tool for removing securement mechanisms in accordance with the present invention.
Figure 24:
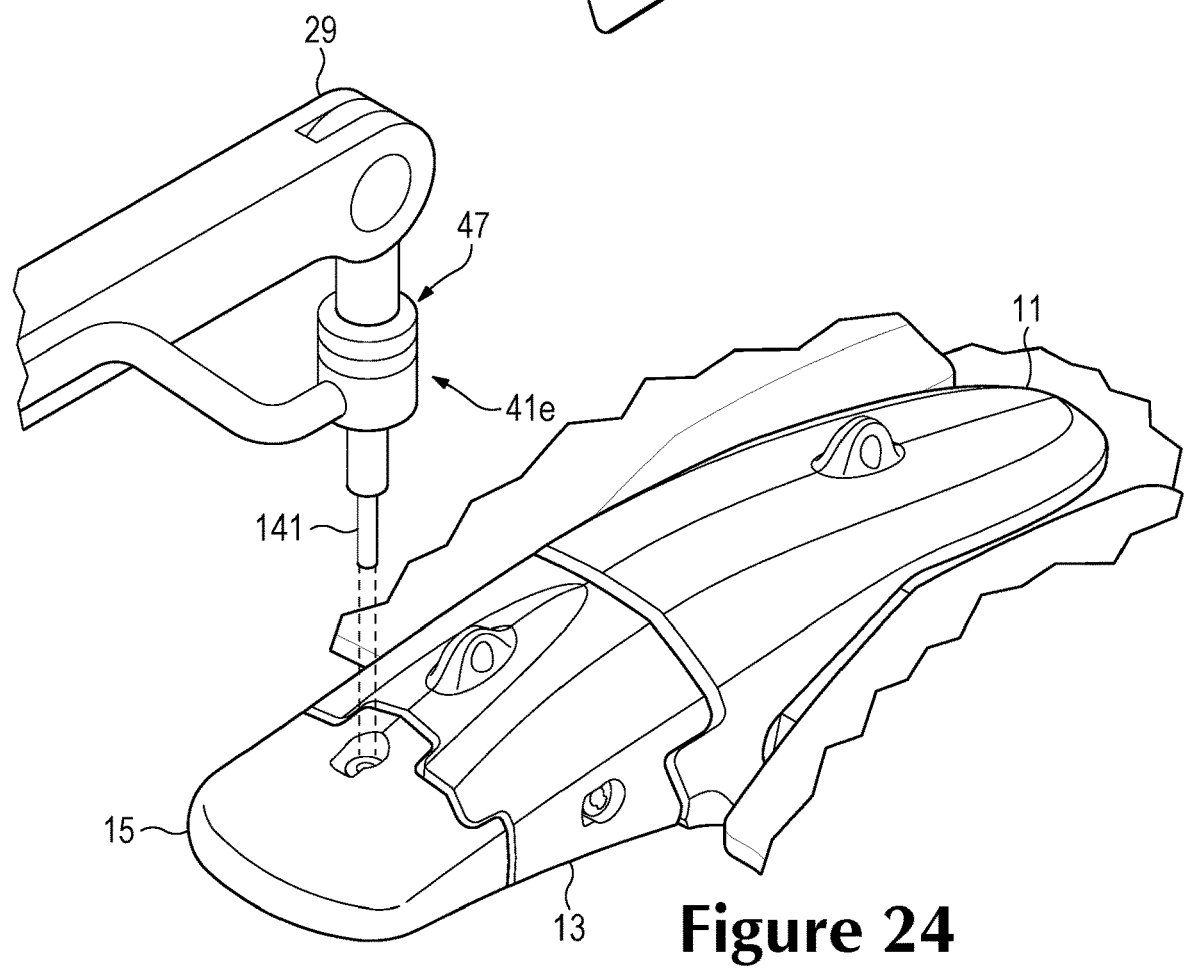
FIG. 24 is a perspective view of a cutter path for removing securement mechanisms in accordance with the present invention.
Figure 25A:
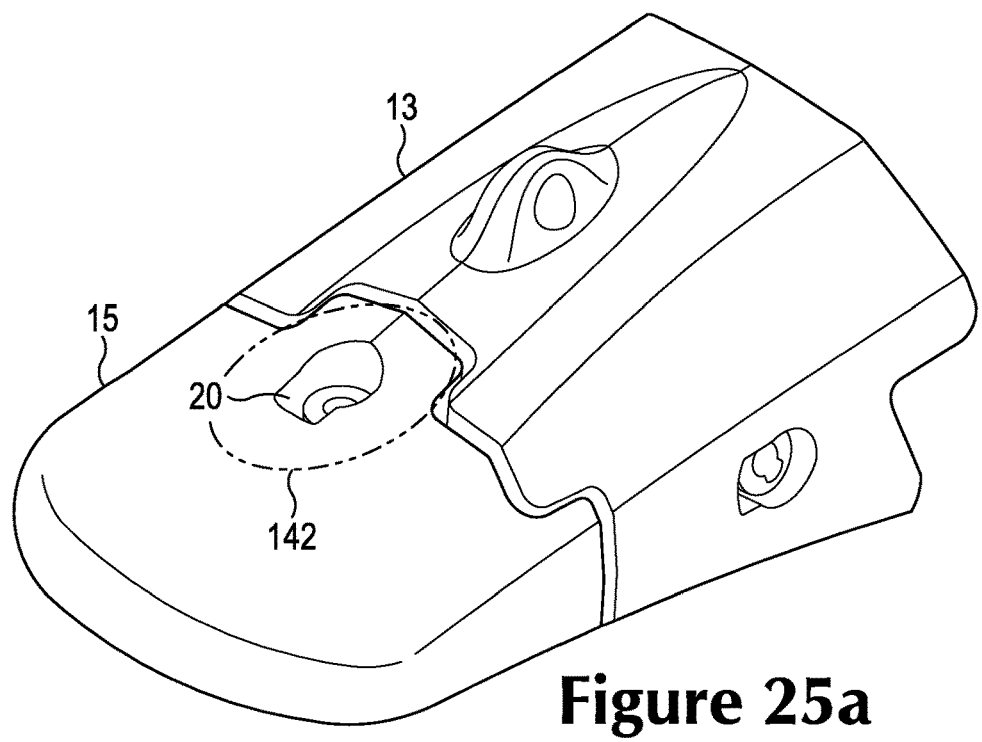
FIG. 25a is a perspective view of a cutting path for removing securement mechanisms between a wear member and a base in accordance with the present invention.
Figure 25B:
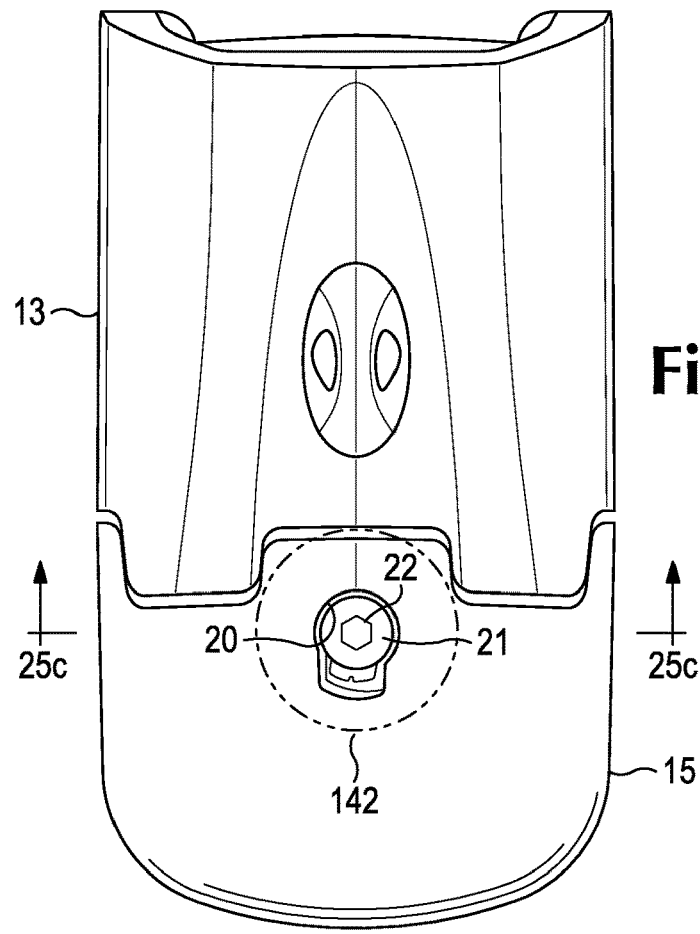
Figure 25C:
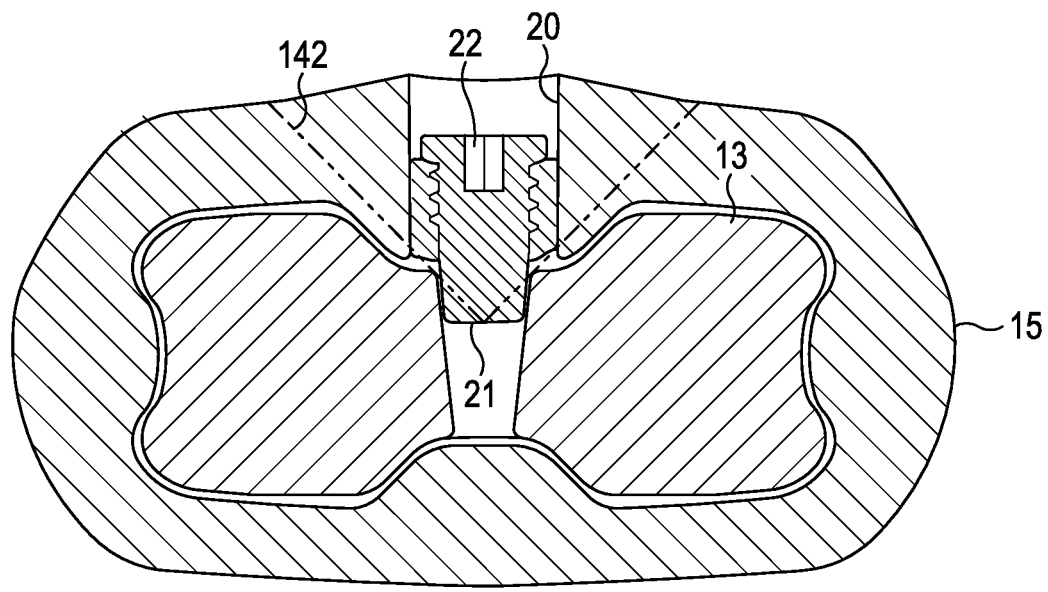
FIG. 25c is a cross-sectional view of the wear member and base in FIG. 25b taken along lines 25c-25c.
Figure 25D:
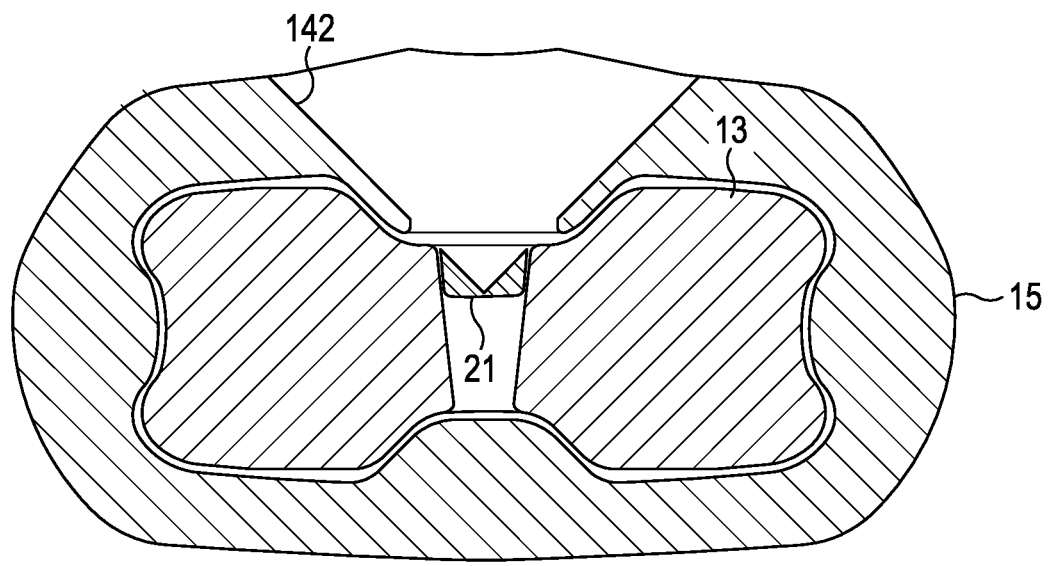
FIG. 25d is a cross-sectional view of the wear member and base in FIG. 25b with the securement mechanism removed.

In an alternative embodiment, an auxiliary tool 41*e* matching the shape of the lock opening 22 may be attached to the manipulator 29. Force control on the manipulator 29 and an algorithm may be used to find the opening 22 in the lock 21. For example, the manipulator 29 and a hex tool 139, that matches the shape of the lock opening 22, can be driven to a programed location X just above the wear member 15 (FIG. 23). The programed location X may be manually input via a user input device or may be determined via receivers and bucket geometry as outlined above. Next the manipulator 29 is driven further toward the wear member 15 along the axis of the lock 21 until the force feedback on the manipulator 29 registers a spike in force indicating that the hex tool 139 is touching the wear member 15. The manipulator 29 continues to move in a variable, generally circular pattern on a plane normal to a longitudinal axis of the lock 21 until the force drops indicating that the hex tool 139 is in at least partial alignment with the lock opening 22. The manipulator 29 may rotate the hex tool 139 to assist in aligning the hex tool 139 within the lock opening 22. The manipulator 29 continues to move in a variable, generally circular pattern on a plane normal to the longitudinal axis of the lock 21 until the force again drops indicating that the hex tool 139 is further aligned with the lock opening 22. The manipulator 29 continues this pattern until the hex tool 139 is in complete alignment with the lock opening 22. The manipulator 29 rotates the hex tool 139 in order to back the lock 21 out of opening 20. If the lock 21 cannot be maintained within the wear member 15 in a release position, the manipulator 29 may switch to another auxiliary tool such as a suction cup (not shown) or an air actuated permanent magnet 65 (FIG. 17) to grip the lock 21 for disposal. The suction cup or air actuated permanent magnet 65 is driven to the programed location X just above the lock 21. Next the manipulator 29 is driven further toward the wear member 15 until the force feedback on the manipulator 29 registers a spike in force. The suction cup or air actuated permanent magnet 65 is then engaged to grab the lock 21 for disposal of the lock 21 in a disposal stall 137 located on the service vehicle 27 or in the service station 53.

In yet another alternative, the manipulator 29 may utilize an auxiliary tool 41*f* to cut the lock 21. The lock 21 may be completely cut up or only the parts of the lock 21 may be cutoff. The cutter 141 may be moved by the manipulator 29 so that the cutter 141 cuts an inverse frustoconical path 142 so that only the lock 21 and wear member 15 are cut (FIGS. 24 and 25*a*-25*d*). The base 13 remains uncut so that the base 13 does not need to be replaced. In an alternative embodiment only the lock 21 is cut. The inverse frustoconical motion path may, for example, converge in a key way void 140 of the base 13. The cutter 141 may be an electric air arc torch, a waterjet cutter, or laser. If the entire lock 21 is not cut up the manipulator 29 may switch to another auxiliary tool, for example a suction cup (not shown) or a magnet 65 (FIG. 17), to remove and dispose of the lock 21 in a disposal stall 137 located on the service vehicle 27 or in the service station 53. Other auxiliary tools to remove other kinds of retainers or locks can be used as well.

Figure 22C:
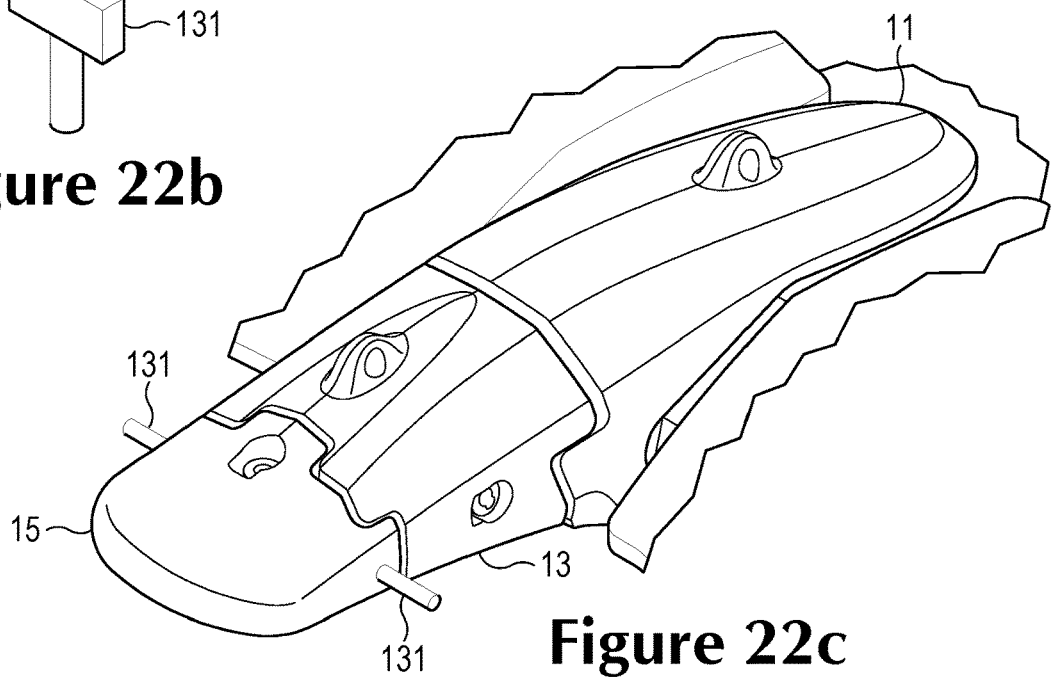
FIG. 22c is a perspective view of a wear member with new pieces attached for removing the wear member from the base in accordance with the present invention.

To disengage the worn wear member 15 from the base 13 the manipulator 29 may first utilize an auxiliary tool 41 to attach at least one gripping piece 131 to the worn wear member 15. For example, the manipulator 29 and an auxiliary tool 41 to attach 131 to the wear member 15 are driven to a programmed location just above the wear member 15. The programmed location may be manually input via a user input device or may be determined via receivers and bucket geometry as outlined above. Next the manipulator 29 is driven further toward the wear member 15 until the force feedback on the manipulator 29 registers a spike in force indicating that the auxiliary tool 41 is touching the wear member 15. The auxiliary tool 41 then attaches at least one piece 131 to the wear member 15. The auxiliary tool 41 may attach one piece 131 to each side of the wear member (FIG. 22*c*). The auxiliary tool 41, for example, may be a stud welder 133 (FIG. 22*a*). The gripping member can also be mechanically attached to the wear member such as by clamp inserted into the lock opening or a component of the lock (e.g., an expansion clamp as sold by Pascal Corporation of Itami, Hyogo, Japan). The manipulator 29 may then switch to another auxiliary tool 41 and go back to the programmed location of the new piece(s) or stud(s) 131 to grip the stud(s) 131. The manipulator 29 would pull on the stud(s) 131 along a longitudinal axis of the base 13 to pull the worn wear member 15 off of the base 13. In an alternative embodiment, the auxiliary tool 41 may also attach gripping pieces 131 to the base 13 (not shown). Attaching pieces 131 to the base 13 allows the auxiliary tool 41 to leverage against the new pieces 131 on the base 13 and the wear member 15 to pull the wear member 15 off of the base 13. The manipulator 29 would then dispose of the worn wear member 15 in a disposal stall 137 located on the service vehicle 27 or in the service station 53. The disposal stall 137 may have fixtures or jigs (not shown) to support the worn wear member 15 so that the parts are maintained in a fixed location.

In an alternative embodiment, the worn wear member 15 may be disengaged from the base 13 by the manipulator 29 pulling the cartridge 69 or the multi-jaw gripper 95 along the longitudinal axis of the base 13.

In an alternative embodiment, the worn wear member 15 may initially be disengaged from the base 13 using a vibrator 125. The vibrator 125 may be similar to the vibrator 125 discussed above for removing fines (FIG. 21). After the initial separation, the manipulator 29 may switch to another auxiliary tool 41, for example, an air actuated permanent magnet 65 similar to the air actuated permanent magnet 65 used to grip the lock for disposal (FIG. 17). The air actuated permanent magnet 65 is driven to the programmed location X just above the wear member 15. Next the manipulator 29 is driven further toward the wear member 15 until the force feedback on the manipulator 29 registers a spike in force. The air actuated permanent magnet 65 is then engaged to grab the worn wear member 15. The manipulator 29 pulls the air actuated permanent magnet 65 and wear member 15 along the longitudinal axis of the base 13 to back the worn wear member 15 off of the base 13 for disposal of the wear member 15 in a disposal stall 137 located on the service vehicle 27 or in the service station 53.

Once the worn wear member 15 has been removed from the base 13, fines on the base 13 may need to be removed prior to installing a new wear member 15. Various auxiliary tools for removing fines exist and the tools may be used manually by an operator or may be used with the manipulator 29. For example, a common tool currently used in the mining industry for removing fines may be utilized. The common tool may be, for example, a pneumatic needle scaler (not shown) or may be a pressure washing system 123 or vibrator 125 as previously discussed (FIGS. 20a, 20b, 20c and 21).

Each new wear member 15 (i.e., the wear member to be installed whether it is new or partially used) is located in a specific location on the storage stalls or pallet 39. Each new wear member 15 may be located on a fixture or jig 45 in a fixed orientation (FIGS. 9 and 10). In an alternative embodiment, each new wear member 15 may be located in a cartridge 69 in a specific fixed orientation and position on the pallet 39. Each pallet 39 is located in a specific fixed location relative to the manipulator 29. When the base 13 is ready for a new wear member 15 to be installed the controller 31 can use the programmed location of the pallet 39 and the programmed location of the new wear member 15 on the pallet to maneuver the manipulator 29 to the new wear member 15. In an alternative embodiment, an operator may use a controller in the form of a user input device (not shown) to maneuver the manipulator 29 to the new wear member 15.

Figure 26A:
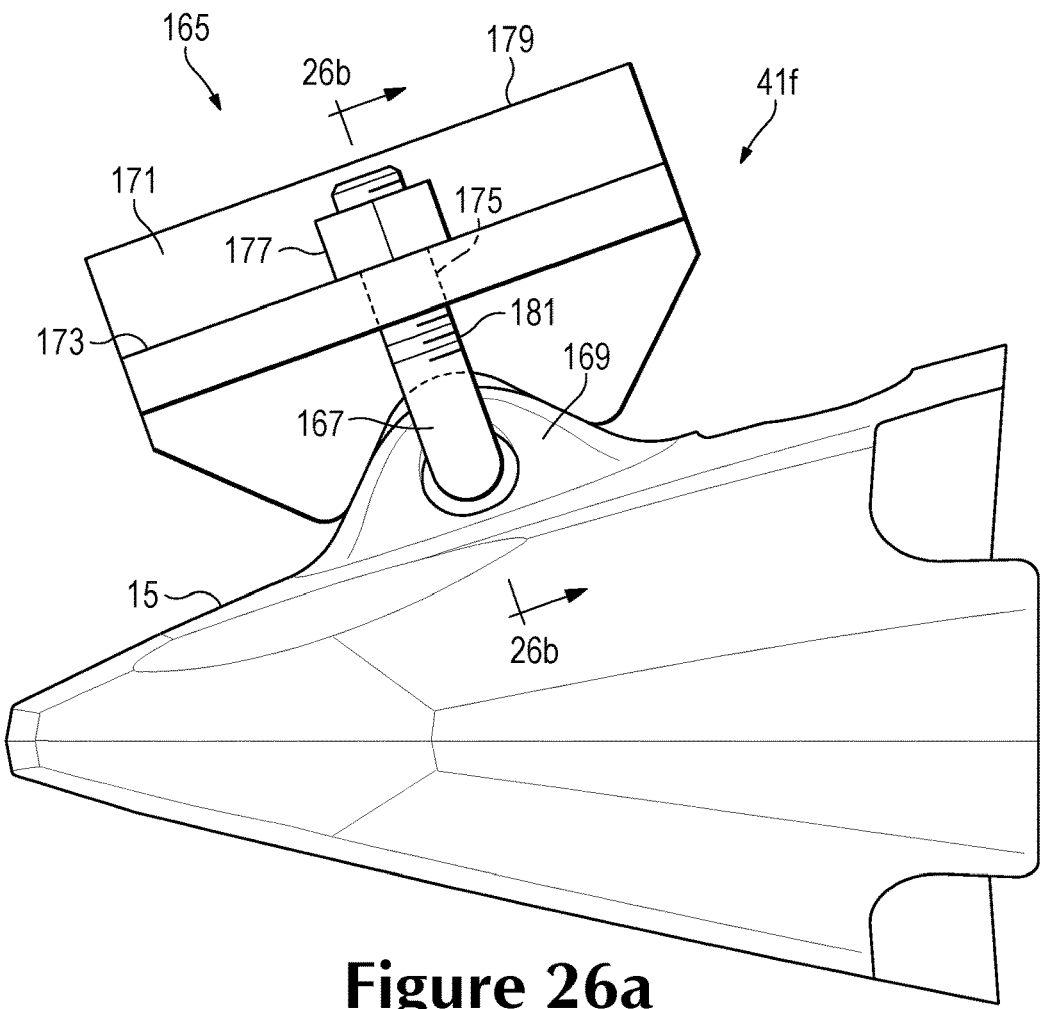
FIG. 26a is a side view of a custom tool for rigidly gripping wear parts in accordance with the present invention.
Figure 26B:
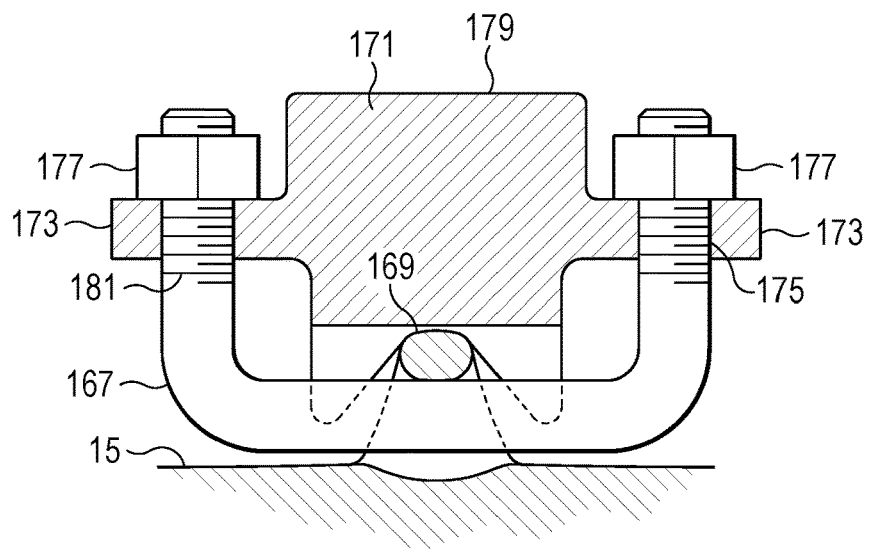

The manipulator 29 may use an auxiliary tool 41 to rigidly grip the new wear member 15. The auxiliary tool 41 may be, for example, a custom tool 165 that rigidly grips a lifting eye 169 on the wear member 15 (FIGS. 26a and 26b). The custom tool 165, may for example, consist of a U-bolt 167 that is threaded 181 on both ends and is passed laterally through a lifting eye 169 on the wear member 15, a double-wedge block 171 with lateral flanges 173 and holes 175 that align with the U-bolt 167, and two nuts 177 to be threaded onto the ends of the U-bolt 167. The double-wedge block 171 is placed over the U-bolt so that the ends of the U-bolt 167 enter the holes 175 on the double-wedge block 171. The nuts 177 are threaded on the ends of the U-bolt 167 to tighten the double-wedge block 171 against the lifting eye 169. Once the nuts 177 have been completely tightened the custom tool 165 eliminates lateral and fore/aft movement of the wear member 15 while lifting, orienting, and positioning the wear member 15. The double-wedge block 171 may have a surface 179 for attaching a tool changer 47 (FIG. 8) so that the custom tool 165 may be used with a manipulator 29. In an alternative embodiment (not shown), a sandwich clamping mechanism in combination with tripod stabilizing pivot feet may be used to rigidly grip the wear member 15. The pivot feet may, for example, utilizing pneumatic, hydraulic, or electric cylinders.

With the new wear member 15 rigidly secured to manipulator 29 the controller 31 maneuvers the new wear member 15 back to the programmed location of the base 13. Because the manipulator 29 picked the wear member 15 up in a fixed orientation and because the custom tool maintains the wear member 15 in a fixed orientation the controller 31 can orient the wear member 15 to fit on the base 13. The manipulator 29 pushes the new wear member 15 onto the base 13. To ensure that the wear member 15 is fully seated on the base 13 the controller 31 compares the current location of the lock opening 22 on the new wear member 15 with the programmed removal location of the lock 21 on the worn wear member 15. In an alternative embodiment, a visual check is performed. The visual check may be performed by an operator or may be performed by a 2D vision camera (not shown). Cameras (not shown) may be located on the manipulator 29 to assist the operator in the visual check.

In an alternative embodiment, the manipulator 29 may grip the attachment mechanism 87 on the cartridge 69 to lift the cartridge 69 from the pallet. Since the wear member 15 has a fixed orientation within the cartridge 69 and the cartridge 69 has a fixed orientation and location on the pallet 39 the controller 31 can rotate and orient the cartridge 69 and the wear member 15 within the cartridge 69 to fit on the base 13. While the manipulator 29 is secured to the attachment mechanism 87, the manipulator 29 pushes the new wear member 15 onto the base 13 until the wear member 15 is fully seated on the base 13. Spring pins 82 may be installed in the guides or locators 81 within the cartridge 69 (FIG. 18b). The spring pins 82 may engage detents in the new wear member 15 to keep the wear member 15 in the cartridge 69. The spring pins 82 engage the wear member 15 until the securement mechanism 21 is in place between the wear member 12 and the base 13 and at which point the spring pins 82 are released and the new wear member 15 is disengaged from the cartridge 69.

Once the new wear member 15 is fully seated on the base 13 the controller 31 locates the new securement mechanism 21. The controller 31 may be programmed with the type of wear member 15 being installed and be programmed with the geometry of the new wear member 15. Based on the programmed geometry of the wear member 15, the manipulator 29 may determine where the securement mechanism 21 needs to be located on the wear member 15. If the new securement mechanism 21 is integrated with the wear member 15 the controller 31 maneuvers the manipulator 29 to the appropriate location on the wear member 15. If the securement mechanism 21 is not integrated with the wear member 15, the controller 31 maneuvers the manipulator 29 to the service stall 39. The securement mechanism 21, like the wear member 15, may be located on the pallet 39 in a fixed location and orientation. In an alternative embodiment, an operator may use a user input device (not shown) to maneuver the manipulator 29 to the securement mechanism 21.

To engage the securement mechanism 21 between the wear member 15 and the base 13, an auxiliary tool 41 matching the shape of the lock opening 22 may be attached to the manipulator 29. For example, as discussed above, force control on the manipulator 29 and an algorithm may be used to place the hex tool 139 in the lock opening 22 (FIG. 23). Once the hex tool 139 is fully seated in the lock opening 22 the hex tool spins the lock to fully secure the wear member 15 to the base 13. In the present example, the hex tool 139 can be used to drive the lock 21 into the lock opening 22 to hold the lock 21 in a hold position to secure the point to the base. In a wear member with an integrated lock, the lock can be in a determined location by the controller still holding the wear member on the base.

The controller 31 may be equipped with error handling features. For example, if the base 13 on the bucket 3 moves between the removal and installation process the manipulator 29 is equipped with force feedback so that if the force feedback encounters a force in a location that the manipulator CPU or controller 31 does not expect to encounter a force, the manipulator 29 returns to a home position. An operator may re-input the base 13 location into the controller 31 by using a user input device (not shown) to maneuver the manipulator 29 to a specific position on the base 13. In an alternative embodiment, the controller 31 may re-learn the base 13 location using receivers, transmitters, and digital sensors on the bucket 3 and service vehicle 27 or service station 53 as previously discussed.

The above disclosure describes specific examples of a process for removing and installing wear parts. The process includes different aspects or features of the invention. The features in one embodiment can be used with features of another embodiment. The examples given and the combination of features disclosed are not intended to be limiting in the sense that they must be used together.

The invention claimed is:

1. A tool for removing a wear member secured to earth working equipment,
wherein the wear member has a front end,
side surfaces and a rear surface in which a mounting cavity is defined,
the tool comprising:
at least one auxiliary tool to hold the wear member mounted on the earth working equipment and to move a retainer securing the wear member to the earth working equipment to a position that permits release of the wear member from the earth working equipment,
wherein the at least one auxiliary tool includes a gripper with a pair of opposite arms that engage and simultaneously hold the side surfaces and rear surface of the wear member;
a manipulator movably supporting the at least one auxiliary tool;
a controller to direct movements of the at least one auxiliary tool and the manipulator so that they cooperate to hold the wear member,
release the retainer and remove the wear member from the earth working equipment; and
a mobile base support and have the capability to move the at least one auxiliary tool and the manipulator to different locations within a mine including from a first location away from the earth moving equipment with wear member to a second location suitable for replacement of the wear member.

2. A tool in accordance with claim 1 wherein the mobile base is a service vehicle drivable to a desired location for removing the wear member from the earth working equipment.

3. A tool in accordance with claim 1 wherein the mobile base is a wheeled service station movable to a desired location for removing the wear member from the earth working equipment.

4. A tool in accordance with claim 1 wherein the mobile base is a tracked service station movable to a desired location for removing the wear member from the earth working equipment.

5. A tool in accordance with claim 1 including a nozzle to spray pressurized fluid to remove fines from the retainer.

6. A tool in accordance with claim 1 including a nozzle to spray pressurized fluid to remove fines from the wear member.

7. A tool in accordance with claim 1 including a disposal stall for receiving the wear member after removal from the earth working equipment.

8. A tool in accordance with claim 1 wherein the controller uses programmable logic to direct movements of the at least one auxiliary tool and the manipulator.

9. A tool in accordance with claim 8 including a communication device for receiving information about the wear member, wherein the controller uses the information to direct the movements of the at least one auxiliary tool and the manipulator.

10. A tool in accordance with claim 8 including a communication device for receiving data regarding the earth working equipment, wherein the controller operates the at least one auxiliary tool and the manipulator to hold and remove the wear member from the earth working equipment based at least partially on the data.

11. A tool in accordance with claim 10 wherein the data includes information about the wear member.

12. A tool in accordance with claim 10 wherein the communication device receives the data from an encoding element.

13. A tool in accordance with claim 10 wherein the communication device receives the data from a wear member monitoring unit.

14. A tool in accordance with claim 8 including at least one sensor to determine a location and orientation of the wear member to be removed.

15. A tool in accordance with claim 8 wherein the controller directs the movement of the at least one auxiliary tool and the manipulator to place the removed wear member at a stowage location.

16. A tool in accordance with claim 8 wherein the manipulator and the at least one auxiliary tool are hydraulically operated.

17. A tool in accordance with claim 1 wherein the controller directs the movement of the at least one auxiliary tool and the manipulator to grip and hold a new wear member at another stowage location and install the new wear member on the earth working equipment.

18. A tool in accordance with claim 1 wherein the manipulator and the at least one auxiliary tool are hydraulically operated.

19. A tool in accordance with claim 1 wherein the controller includes a user input device operable by an operator at a location remote from the wear member and the manipulator.

20. A tool in accordance with claim 1 which includes a tool changer to secure different auxiliary tools to the manipulator.

21. A tool in accordance with claim 1 wherein the at least one auxiliary tool includes a wrench to turn the retainer formed as a threaded pin.

22. A tool in accordance with claim 1 which includes a first sensor to receive information on the wear member from a second sensor in the wear member.

23. A tool in accordance with claim 1 wherein the controller operates at least partially manually by a remote user.

24. A tool in accordance with claim 23 wherein the controller includes a joystick operated by the remote user.

25. A tool in accordance with claim 1 wherein the at least one auxiliary tool includes a vibrator to contact and apply a vibration to the wear member to ease disengagement of the wear member from the base.

26. A tool for removing a wear member secured to earth working equipment, wherein the wear member has a front end, side surfaces and a rear surface in which a mounting cavity is defined to receive a base of the earth working equipment, the tool comprising:
at least one auxiliary tool to hold the wear member mounted on the earth working equipment,
wherein the at least one auxiliary tool includes a gripper with a pair of opposite arms that engage and simultaneously hold the side surface and rear surfaces of the wear member;
a manipulator movably supporting the at least one auxiliary tool; and
a controller to direct movements of the at least one auxiliary tool and the manipulator so they cooperate to hold the wear member and remove the wear member from the earth working equipment.

27. A tool in accordance with claim 26 including a mobile base to support and move the at least one auxiliary tool and the manipulator to different locations including from a first location away from the earth working equipment with the wear member to a second location suitable for replacement of the wear member.

28. A tool in accordance with claim 26 wherein the controller uses programmable logic to direct movements of the at least one auxiliary tool and the manipulator.

29. A tool in accordance with claim 26 wherein the controller directs the movement of the at least one auxiliary tool and the manipulator to grip and hold a new wear member at another stowage location and install the new wear member on the earth working equipment.

30. A tool in accordance with claim 26 including a tool changer to secure different auxiliary tools to the manipulator.

31. A tool in accordance with claim 26 wherein the at least one auxiliary tool moves a retainer securing the wear member to the earth working equipment to a position that permits release of the wear member from the earth working equipment, and the controller direct movements of the at least one auxiliary tool to release the retainer.

32. A tool in accordance with claim 26 which includes a first sensor to receive information on the wear member from a second sensor in the wear member.

33. A tool in accordance with claim 26 wherein the controller operates at least partially manually by a remote user.

34. A tool in accordance with claim 33 wherein the controller includes a joystick operated by the remote user.

35. A tool in accordance with claim 26 wherein the at least one auxiliary tool includes a vibrator to contact and apply a vibration to the wear member to ease disengage of the wear member from the base.

* * * * *